United States Patent [19]

Masunaga et al.

[11] Patent Number: 4,551,758
[45] Date of Patent: Nov. 5, 1985

[54] IMAGE PICK-UP DEVICE AND SYSTEM

[75] Inventors: Makoto Masunaga; Takao Kinoshita, both of Tokyo, Japan

[73] Assignee: Canon Kabushiki Kaisha, Tokyo, Japan

[21] Appl. No.: 499,536

[22] Filed: May 31, 1983

[30] Foreign Application Priority Data

Jun. 9, 1982 [JP] Japan ................................. 57-99861
Dec. 8, 1982 [JP] Japan ................................. 57-215900

[51] Int. Cl.⁴ .............................................. H04N 3/14
[52] U.S. Cl. ........................................ 358/213; 357/24
[58] Field of Search ....................... 358/212, 213, 44; 357/24, 30; 250/211 J

[56] References Cited

U.S. PATENT DOCUMENTS

| | | | |
|---|---|---|---|
| 4,204,230 | 5/1980 | Sprague | 358/212 |
| 4,314,279 | 2/1982 | Yoshida | 358/212 |
| 4,315,284 | 2/1982 | Stillwell | 358/212 |
| 4,475,125 | 10/1984 | Esser | 358/213 |
| 4,486,783 | 12/1984 | Tanaka | 358/213 |
| 4,489,350 | 12/1984 | Kimura | 358/213 |
| 4,498,106 | 2/1985 | Sato | 358/212 |
| 4,499,496 | 2/1985 | Tanaka | 358/213 |

Primary Examiner—Gene Z. Rubinson
Assistant Examiner—L. C. Schroeder
Attorney, Agent, or Firm—Fitzpatrick, Cella, Harper & Scinto

[57] ABSTRACT

A system for generating an electrical indication indicative of an image scansion, comprising in combination: image sensing means including a plurality of one-dimensional image sensing arrays arranged in parallel with each other, each of the sensing arrays being for generating an electrical indication indicative of a line scansion of a portion of an image; storage means including a plurality of one-dimensional storage arrays arranged in parallel with each other; and control means for controlling the image sensing means and the storage means, the control means causing the sensing means to successively form, at a selected one of the sensing arrays, composite electrical indications each being composed of a selected plural number of the line scansion indications and causing the storage means to successively store the composite electrical indications formed by the sensing means.

39 Claims, 19 Drawing Figures

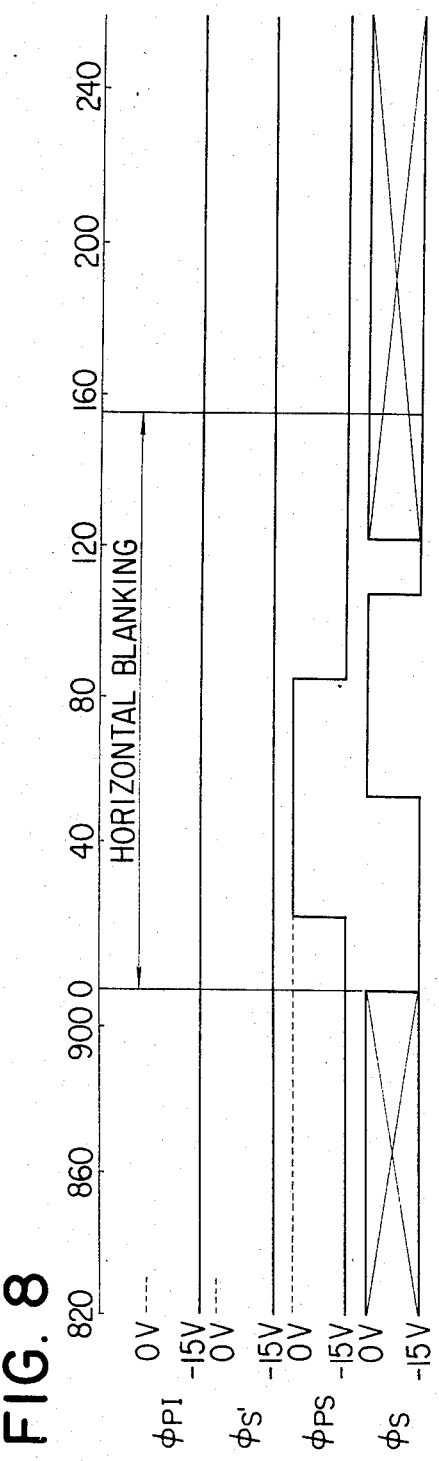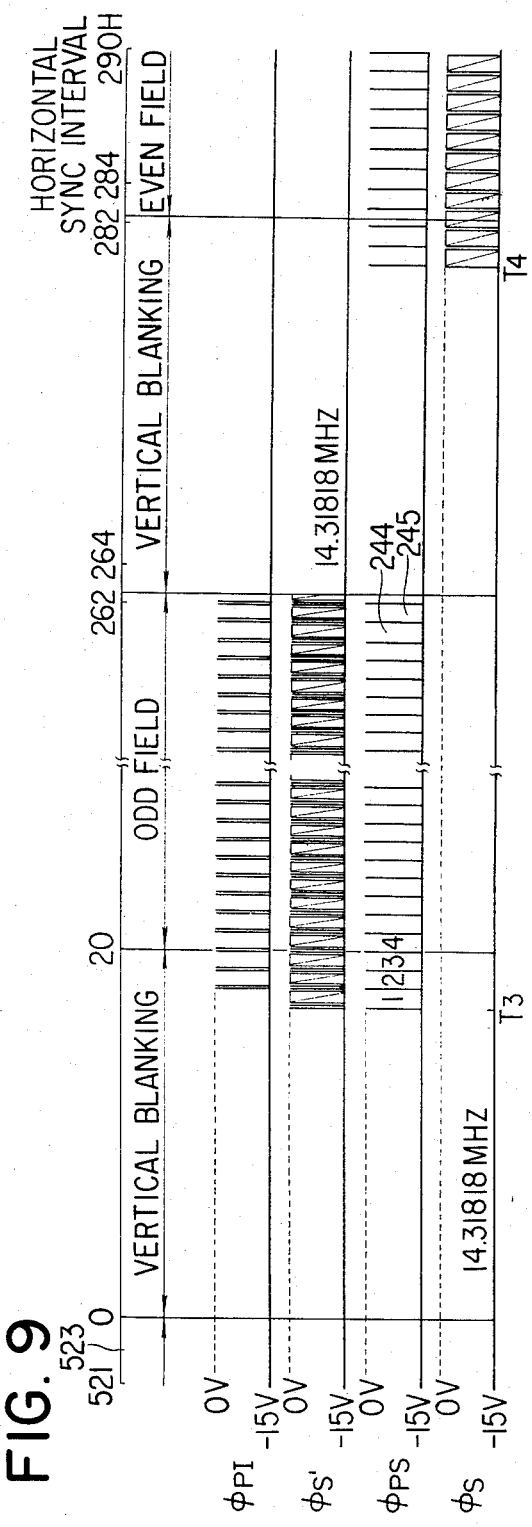

IMAGE PICK-UP DEVICE AND SYSTEM

BACKGROUND OF THE INVENTION

1. Field of the Invention

The present invention relates to an image pick-up device and, more particularly, an image pick-up device and system wherein the image pick-up device comprises an image sensor having a plurality of photocells arranged along rows and columns thereof and a storage for storing signals from the image sensor.

2. Description of the Prior Art

The image pick-up device of the type described above is well-known as a frame transfer image pick-up device. Conventionally, in the frame transfer image pick-up device, the number of vertically arranged photocells (the number of rows of the image sensor) is 245, nearly equal to half the 525 horizontal scanning lines for one frame in the NTSC color system. The photocells can store signals corresponding to data for 245 horizontal scanning lines (i.e., one-field data) since they have both photosensitivity and data transfer functions. After the signals for one field are read out, the effective photosensitive region of the photocells is shifted for image pick-up, and then the subsequent signals for a different field are read out, thereby performing interlaced scanning to obtain an interlaced frame image.

The above system is most suitable for an interlaced scanning television system since an image with a high resolution can be obtained in spite of a small number of photocells.

However, the size and sensitivity of the photocell are limited. As a result, the image pick-up sensitivity of the photosensor is limited. Although various attempts have been conventionally made to improve the sensitivity of the image pick-up device, an image pick-up device with good resolution has not been proposed.

In the image pick-up systems such as illustrated in the copending applications Ser. No. 390,055 filed on June 18, 1982 by NOBUYOSHI TANAKA et al and Ser. No. 390,054 filed on June 18, 1982 by NOBUYOSHI TANAKA et al and assigned to the same assignee, signals generated from a plural number (e.g., 2 rows) of rows in an image sensor are added during the transfer from the image sensor to a storage and stored in the storage. By reading out the sum signals from the storage, an effective image pick-up sensitivity of the photosensor is improved. It is also possible to perform 2:1 interlacing by changing the rows to be added together between the first and second fields. In an image pick-up system according to a preferred embodiment to be described later, the addition of row signals is performed at the first row of the storage (i.e., the row of the storage which is adjacent to the image sensor).

SUMMARY OF THE INVENTION

The present invention has been made ro further improve the image pick-up system and device of the previous applications assigned to the same assignee, as described above.

In particular, it is a primary object of the present invention to provide a new image pick-up system and a device thereof wherein an image pick-up sensitivity is greatly improved, but blooming is effectively prevented.

In order to achieve the above object of the present invention, there is provided an image pick-up system including: image sensing array including a plurality of photocells arranged in rows and columns; storage for storing electrical indications indicative of a distribution pattern of incident light which is obtained in the image sensing array; and control means for controlling the image sensing array and the storage to perform the addition of electrical indications for plural rows of photocell at a selected row in the image sensing array which is adjacent to the storage and then to store the sum of electrical indications into the storage.

In the conventional image pick-up system of the preceding applications, the addition of the line scansion indications for plural rows formed by the image sensing means is performed by using the first row of the storage means. However, according to the image pick-up system of the present invention, the addition of the line scansion indications is performed by using the last row of the image sensing means which is adjacent to the storage means. The difference between the conventional system and the system of the present invention entails the following advantages of the latter. An overflow tends to occur upon addition of electrical indications. The image sensing means is generally provided with means for preventing blooming incurred by diffusion of the overflow component. This blooming preventive means, however, is not provided for the storage means. Therefore, when the electrical indications are added together using part of the image sensing means, even if an overflow of the electrical indications occurs, the overflow component is cleared by the blooming preventive means. As a result, blooming can be significantly eliminated, and the image pick-up sensitivity can be significantly improved.

In order to further achieve the above object of the present invention, there is provided an image pick-up device according to another preferred embodiment, comprising an image sensor having a plurality of photocells arranged along rows and columns thereof and a storage for storing electrical indications which are indicative of a distribution pattern of incident light and which are formed by the image sensor, wherein a storage capacity of each of photocells arranged along at least one sensing row adjacent to the storage is larger than that of each of photocells arranged along other sensing rows so as to use the sensing row having the larger capacity for adding together a plural number of line scansion indications. In the construction described above, the addition capacity is increased, so that blooming is effectively prevented and the effective image pick-up sensitivity is greatly improved.

It is a secondary object of the present invention to provide an image pick-up device suitable for frame recording in a two fields-one frame still video system together with the primary object.

Extensive studies have been made of magnetically recording a still video signal using a solid-state image pick-up device such as a CCD instead of using a conventional silver chloride film, so as to develop a still video camera or video photography. When a frame transfer type image pick-up device for 2:1 interlaced scanning in the conventional movie video system is used and frame recording is taken to obtain high image quality, since one frame consists of two fields whose television signals are lagged by, for example, 1/60 second, a poor image is obtained for a moving subject, resulting in inconvenience. Accordingly, apart from the previously mentioned objects, the additional object of the present invention is to provide an image pick-up device available for the frame recording in a still video system, which eliminates this drawback.

In the image pick-up device of the above-mentioned preferred embodiment of the present invention, the number of rows of memory cell in the storage can be half that of the rows of photocell in the image sensor in order to obtain an interlacing effect at a ratio of two fields to one frame. A register or data readout/transfer section is arranged between the image sensor and the storage to selectively or alternately read out the electrical indications formed by the image sensor and supply them outside the device or transfer them to the storage. When the data of the first field among the frame data obtained by the image sensor is read out by the register from the image sensor, the register allows writing of the data of the second field into the storage. After the data of the first field has been processed, the data of the second field is read out from the storage, thereby performing two fields-one frame interlaced scanning. In this manner, the image pick-up device of the present invention can be suitably applied to frame recording in the still video system of two fields-one frame interlacing. As a result, the conventional drawback described above can be completely eliminated.

Other objects and features of the present invention will be apparent from the following description taken in conjunction with the accompanying drawings.

BRIEF DESCRIPTION OF THE DRAWINGS

The present invention is best understood taken together with the following accompanying drawings, in which:

FIGS. 6, 7, 8, 9 and 10 are timing charts of output pulses from the drive circuit shown in FIG. 5, respectively;

DETAILED DESCRIPTION OF THE PREFERRED EMBODIMENTS

Figure 1:
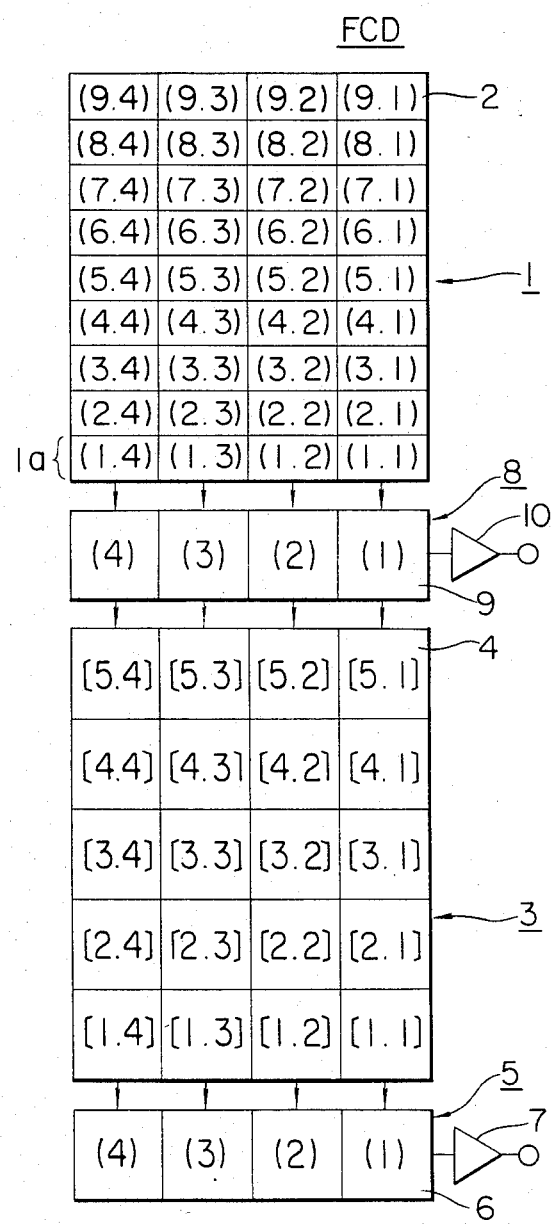
FIG. 1 is a schematic view showing an image pick-up device used in an image pick-up system according to an embodiment of the present invention.

FIG. 1 shows the overall construction of a frame transfer image pick-up device FCD. The image pick-up device FCD has an image sensor 1. When the device FCD is applied to an NTSC color television system, the number of photocells 2 arranged in the vertical direction (FIG. 1) (the number of photocells arranged along each column of the image sensor) substantially corresponds to the number of horizontal scanning lines (i.e., 490 H lines) constituting one frame. This number is about twice that of photocells of the conventional frame transfer image pick-up device. The number of the photocells 2 arranged in a row of the image sensor 1 (that in the number of columns) is generally set as 390, 570 or 780 corresponding to the chrominance subcarrier frequency. FIG. 1 shows only 36 photocells (9 vertical or column photocells × 4 horizontal or row photocells) for illustrative convenience.

A storage 3 stores signals read out from the image sensor 1. Memory cells 4 of the storage 3 are arranged in a matrix form such that the number of row memory cells is the same as that of the row photocells, but that the number of column memory cells is half (about 245 vertical lines) that of the column photocells. However, the number of photocells and memory cells may vary as needed. FIG. 1 shows only 20 memory cells 4 (5 vertical or column memory cells × 4 horizontal or row memory cells) for illustrative convenience. Therefore, the number of memory cells 4 is equal to that of the memory of the conventional frame transfer type CCD image pick-up device.

In the image pick-up system according to the first embodiment, the signals for one television frame are generated in the image sensor 1 and when shifted to one storage 3 the signals of two rows are added together in a final row or array 1a of the image sensor 1, as will be described later. As a result, signals for scanning lines the number of which is half the number of scanning lines in one frame, that is one field signal, can be formed. When these signals are read out from the storage 3, the effective image pick-up sensitivity of the image sensor 1 can be greatly improved. By a simple calculation, the sensitivity is improved twofold. Furthermore, each combination of two rows of the first field is made different from that of the second field, thereby performing interlaced scanning.

As described above, the row signals formed by the image sensor 1 are added together in the image sensor 1 using the photocells 2 arranged in the final array (row) 1a. The above arrangement has an advantage in that, even if a signal overflow occurs due to the signal addition, an anti-blooming means conventionally arranged in the image sensor for preventing blooming absorbs the overflow component so as to prevent blooming, as will be described later.

A horizontal output register 5 reads out signals from the storage 3. The register 5 comprises a single array of charge transfer cells 6 which number the same as the number of cells in a horizontal direction, that in the number of columns of the image sensor 1 and of columns of the storage 3. An amplifier 7 converts charge transferred from the register 5 to a voltage.

When the image pick-up device FCD is applied to frame recording in the two fields-one frame still video system, an intermediate readout/transfer register 8 is arranged between the image sensor 1 and the storage 3.

The register 8 comprises a single row charge transfer register having charge transfer cells 9, the number of which is equal to that of cells in a horizontal direction, that is the number of columns of the image sensor 1 and the number of columns of the storage 3. When the image pick-up device FCD of the present invention is applied to the two fields-one frame system, as will be described later, the intermediate register 8 transfers alternate line signals out of the signals obtained by the image sensor 1 to the storage 3, and serves to produce the alternate signals through an output amplifier 10. The line signals of the first field are obtained through the amplifier 10, while the line signals of the second field are obtained through the amplifier 7. As a result, the signals of one frame which are generated during the same interval are separately obtained for two fields. Therefore, the conventional problem arising at the time when a charge-coupled device used for field recording in a movie video system is applied to frame recording in a still video system can be eliminated.

It should be noted that the intermediate register 8 only serves to transfer the storage signals from the image sensor 1 to the storage 3 when the image pick-up device FCD is applied to the movie video system.

A charge-coupled device (CCD) is conventionally driven by single-phase driving, two-phase driving, three-phase driving or four-phase driving. Any one of these driving methods can be used for the image pick-up device FCD described above. A case will be described wherein a single-phase driving method is adopted for the image pick-up device FCD for illustrative convenience. The detailed construction of the image sensor 1, the intermediate register 8, the storage 3, and the horizontal output register 5 of the image pick-up device FCD shown in FIG. 1 will be described with reference to FIG. 2. The single-phase driving method is described in Japanese Patent Laid-Open Gazette No. 55-11394 (corresponding U.S. Pat. No. 4,229,752). This method does not fall within the scope of the present invention, and a detailed description thereof will be omitted.

Figure 2:
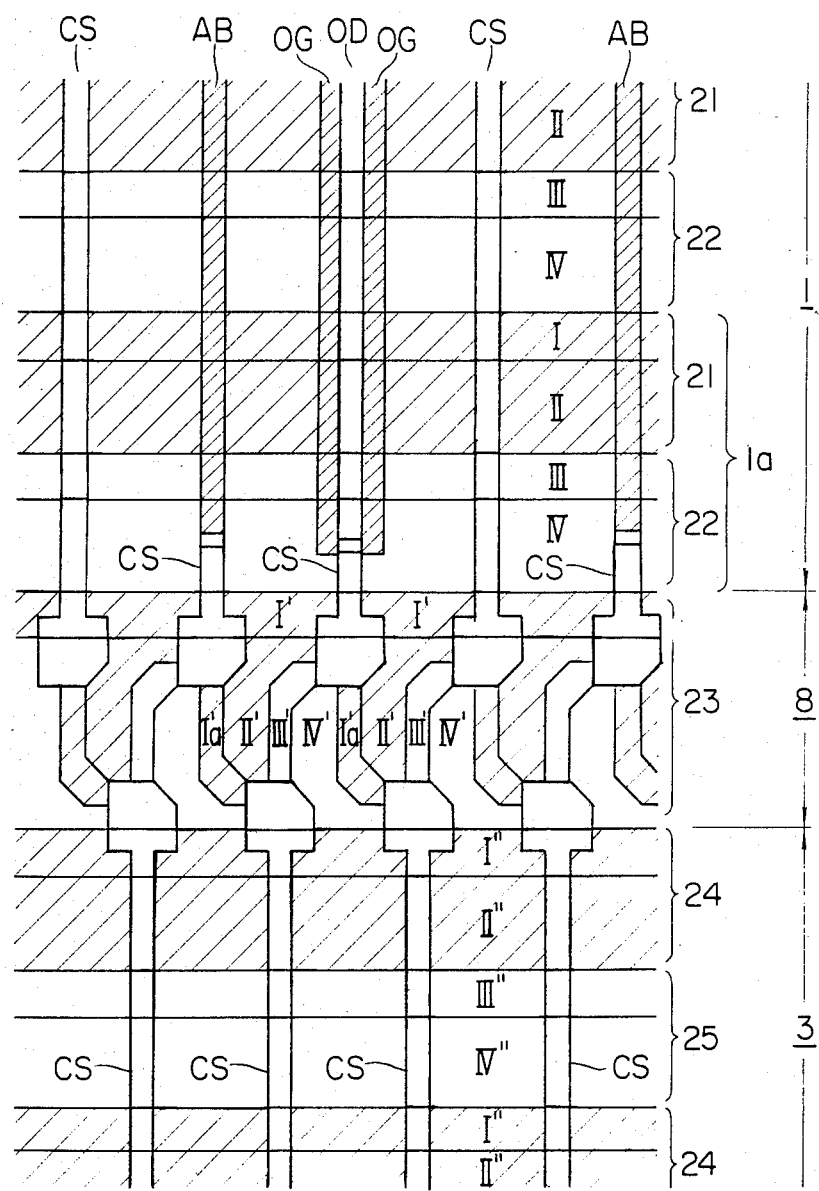
FIG. 2 is a plan view partially showing an image sensor, a storage, and an intermediate register serving as a readout/transfer section of the image pick-up device shown in FIG. 1 wherein the readout/transfer section is formed between the image sensor and the storage.

Referring to FIG. 2, a channel stop CS prevents mixing of charge signals between the horizontal cells. An anti-blooming barrier AB prevents blooming. An overflow drain gate OG and an overflow drain OD constitute an anti-blooming means. The formation of the channel stop CS, the anti-blooming barrier AB, the overflow drain gate OG and the overflow drain OD as shown in FIG. 2 provides a compact device of an increased number of pixels without degradation of the image pick-up sensitivity. Furthermore, a television signal with high quality can be easily obtained. For example, the formation described above is described in Japanese Patent Laid-Open Gazette No. 55-56789 or the like.

A poly-Si or polycrystalline silicon electrode 21 of the image sensor 1 comprises regions I and II which have different potentials. An imaginary electrode 22 formed in the silicon layer has regions III and IV which have different potentials. The regions I to IV constitute a single photocell 2 in the vertical direction.

A region 23 corresponds to the intermediate register 8. In this region, columb-like poly-Si electrode is formed as indicated by the hatched area. The silicon region under the poly-Si electrode is divided into regions I', II' and I'a which have different potentials. Although the potential at the region I' is the same as that at the region I'a, the regions I' and I'a are isolated by a channel stop CS. The regions III' and IV' have the same potentials as those in the regions III and IV of the imaginary electrode 22 of the image sensor 1, respectively. An electrode 24 and an imaginary electrode 25 of the storage 3 have the same construction as that of the electrode 21 and the imaginary electrode 22 of the image sensor 1, respectively. Regions I'', II'', III'' and IV'' of the storage 3 correspond to the regions I, II, III and IV of the image sensor 1, respectively. The regions I'', II'', III'' and IV'' constitute the single memory cell 4.

Figure 3:
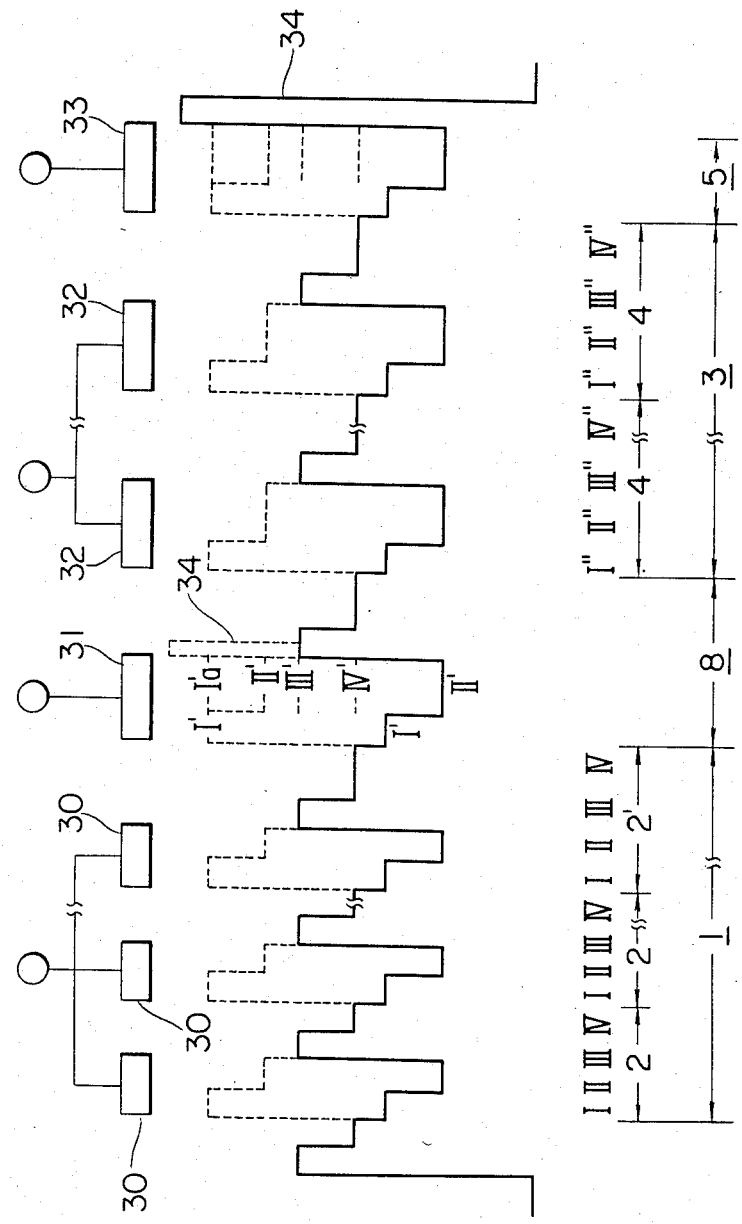
FIG. 3 is a representation showing an internal potential state of the image pick-up device shown in FIG. 1.

FIG. 3 shows internal potential conditions of the image pick-up device FCD shown in FIG. 2.

Referring to FIG. 3, poly-Si electrodes 30 of the image sensor 1 correspond to the electrode 21 shown in FIG. 2. The poly-Si electrodes of the image sensor 1 are commonly connected. A voltage for charge transfer is applied to the poly-Si electrode 30. The potential at the region I of the silicon layer under the poly-Si electrode 30 is higher than that at the region II thereof.

The dotted line in FIG. 3 indicates that the poly-Si electrode 30 is held at a high negative voltage (e.g., $-15$ V), and the solid line indicates that the poly-Si electrode 30 is held at a low negative or positive potential (e.g., 0 V).

In the imaginary electrode 22 shown in FIG. 2, the potential at the region III is slightly higher than that at the region IV, as shown in FIG. 3. The potentials at the regions III and IV do not depend on a voltage applied across the poly-Si electrode 30 and are held constant. When a high constant negative voltage (e.g., $-15$ V) is applied to the poly-Si electrode 30, charge is stored in the region IV of the imaginary electrode 22. When a voltage pulse is applied to the electrode 30, which is at the low negative or positive voltage (e.g., 0 V) for a moment the charge is transferred from the region IV.

A poly-Si electrode 31 is formed in the intermediate register 8. The poly-Si electrode 31 is isolated from the poly-Si electrode 30 of the image sensor 1, so that the poly-Si electrodes 30 and 31 may receive different voltages. The potentials at the regions of the intermediate register 8 are illustrated under the poly-Si electrode 31.

Poly-Si electrodes 32 are formed in the storage 3. The potentials at each of the regions of the storage 3 are the same as those at the corresponding regions of the image sensor 1.

A poly-Si electrode 33 is formed in the horizontal output register 5. The construction of the horizontal output register 5 is substantially the same as that of the intermediate register 8 except that the channel stop CS closes it at one side portion 34.

Charge transfer in the intermediate register 8 will be described. The charge accumulated in the region IV of the image sensor 1 is transferred to the next region IV when voltage pulses are applied across the poly-Si electrode 30 to lower the potentials of the regions I and II as indicated by the solid line in FIG. 3. If the above-mentioned next region IV is adjacent to the regions I' and II' of the intermediate register 8, and a low positive or negative voltage is applied to the poly-Si electrode 31 of the intermediate register 8, the regions I' and II' have potentials as indicated by the solid line in FIG. 3, so that the charge in the region IV is transferred to the region II' through the region I'. Thereafter, when a high negative voltage is applied across the poly-Si electrode 31, the regions I' and II' have potentials as indicated by the dotted line in FIG. 3, so that the charge in the region II' is transferred to the region IV' (which has a predetermined potential indicated by the dotted line) through the region III' (which has a predetermined potential indicated by the dotted line). In this condition, when a low negative or positive voltage is applied across the poly-Si electrode 32 of the storage 3, the potentials at the regions I" and II" are lowered as indicated by the solid line in FIG. 3 so as to transfer the charge of the region IV' to the region II" through the region I".

The charge transferred to the region II" of the storage 3 is further transferred to the region IV" through the region III' since the potentials of the regions I" and I" change as indicated by the dotted line in FIG. 3 upon application of the high negative voltage to the poly-Si electrode 32 of the storage 3. In this manner, by applying a drive signal to the poly-Si electrode 32, the stored charge is transferred to the horizontal output register 5 through the regions IV"', II" and IV" in the order named. The data (i.e., charge) can be read out through the horizontal output register 5.

The charge transfer mechanism described above is the same as in the conventional single-phase driven transfer CCD which has no intermediate register 8.

The flow of charge through the intermediate register 8 for readout of the signal to the outside will be described.

In the above, the charge transferred to the region IV' of the intermediate register 8 is transferred to the storage 3 by applying the low negative or positive voltage across the poly-Si electrode 32 of the storage 3. However, if voltage pulses are applied to the poly-Si electrode 31 of the intermediate register 8 while the poly-Si electrode 32 is kept at the high negative voltage so as to hold the potentials of the regions I" and II" of the storage 3 as indicated by the dotted line in FIG. 3, the potentials at the regions I' and II' alternately change between the states as indicated by the solid and dotted lines in FIG. 3. As a result, the charge (charge packet) in the region IV' is transferred through the regions I'a, II', III' and IV' in the horizontal direction (direction normal to the surface of the drawing in FIG. 3) in the order named. The charge is then produced as a voltage through the amplifier 10 shown in FIG. 1.

Figure 7:
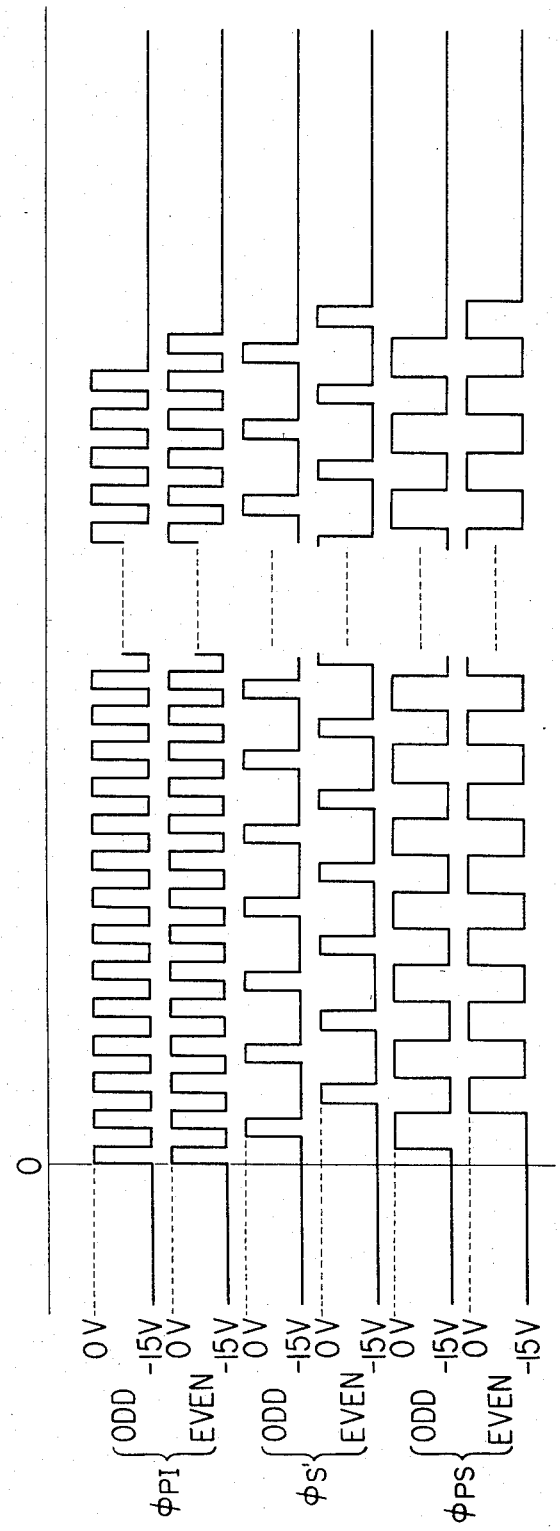

As far as the construction is concerned, the construction of the image pick-up device FCD described above is substantially the same as that of the image pick-up device (which is shown in FIGS. 7 and 8 of the previous application) assigned to the same assignee, except that the image sensor of the conventional image pick-up device does not have the anti-blooming means constituted by the overflow drain gate OG and the overflow drain OD.

The practical operation of the image pick-up device FCD will be described with reference to FIG. 4.

Figure 4:
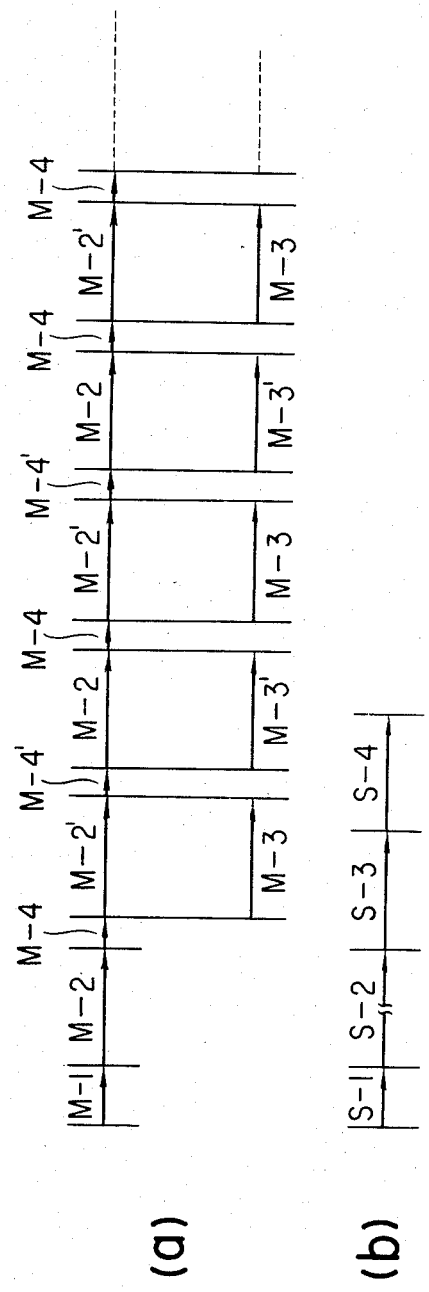
FIG. 4 shows charts (a) and (b) for explaining an operation sequence when the image pick-up device is used in practice.

In FIG. 4, (a) shows an operation sequence when the image pick-up device FCD is applied to a movie video system, and (b) shows an operation sequence when the image pick-up device FCD is applied to a still video system.

First, the case shown in FIG. 4(a) will be described. Referring to FIG. 4(a), indicated by M-1 is an all clear mode wherein charge stored by a dark current or the like before exposure (i.e., image pick-up operation) is cleared through the overflow drain OD (FIG. 2) or expelled outside through the high speed operation of image pick-up device FCD. It should be noted that the all clear mode M-1 need not be used in the movie video system and may be omitted. A storage mode M-2 indicates storage of the data of the first field, and a storage mode M-2' indicates storage of the data of the second field. A readout mode M-3 is set to read out the data (charge stored in the storage mode M-2) of the first field, and a readout mode M-3' is set to read out the data (charge stored in the storage mode M-2') of the second field. A vertical transfer mode M-4 is set to transfer the charges (charge packets) accumulated in the image sensor 1 to the storage 3.

Since the image pick-up device FCD has 490 column photocells of the image sensor 1 and 245 column memory cells of the storage 3, charge transfer operation from the image sensor 1 to the storage 3 and interlacing thereof are different from those of the conventional CCD image pick-up device.

During the mode M-2 shown in FIG. 4(a), exposure is performed. In other words, during this period, charge is generated and accumulated in the image sensor 1. Thereafter, in a mode M-4, the accumulated charges (charge packets) in the image sensor 1 are transferred to the storage 3. More particularly, the charges accumulated in the photocells of each row of the image sensor 1 are transferred to the next row within the image sensor 1. In this case, no voltage pulse is applied to the intermediate register 8 or the storage 3. Therefore, charges accumulated in the photocells indicated by (2, 1), (2, 2), (2, 3) and (2, 4) are transferred to the photocells indicated by (1, 1), (1, 2), (1, 3) and (1, 4), respectively. The transferred charges are added to the charges already stored in the photocells indicated by (1, 1), (1, 2), (1, 3) and (1, 4), respectively. At this time, the charges in the rows of photocells indicated by (3, 1) to (3, 4), ..., (9, 1) to (9, 4) are transferred to the rows of photocells indicated by (2, 1) to (2, 4), ..., (8, 1) to (8, 4), respectively. It should be noted that the address of each photocell is indicated by (X, Y) and that the address of each corresponding memory cell is indicated by [X, Y] hereinafter.

Voltage pulses are applied to the image sensor 1, the intermediate register 8 and the storage 3 to sequentially transfer the charges by one row. The charges (charge packets) in the row of photocells indicated by (1, 1) to (1, 4) which corresponds to a sum of the charges accumulated during exposure in the rows of photocells indicated by (1, 1) to (1, 4) and (2, 1) to (2, 4), is transferred to the array of transfer cells of the intermediate register 8 which are indicated by (1) to (4). The charges in the rows of photocells indicated by (3, 1) to (3, 4), ..., and (9, 1) to (9, 4) (i.e., the charges obtained during exposure in the rows of photocells indicated by (2, 1) to (2, 4), ..., and (8, 1) to (8, 4)) are respectively transferred to the rows of photocells indicated by (1, 1) to (1, 4), ..., and (7, 1) to (7, 4).

When the voltage pulses are applied again only to the image sensor 1, the charges in each row of the image sensor 1 are transferred by one row only within the image sensor 1. The charges in the row of photocells indicated by (2, 1) to (2, 4) corresponds to the charge accumulated during exposure in the row of photocells indicated by (4, 1) to (4, 4) are transferred to the row of photocells indicated by (1, 1) to (1, 4). At the row of (1, 1) to (1, 4), this charges are added to the charges previously transferred from the row of photocells indicated by (3, 1) to (3, 4). The accumulated charges in the rows of photocells indicated by (3, 1) to (3, 4), ..., and (7, 1) to (7, 4), respectively and corresponding to the charges obtained during exposure in the rows of photocells indicated by (5, 1) to (5, 4), ..., and (9, 1) to (9, 4), respectively are transferred to the rows of photocells indicated by (2, 1) to (2, 4), . . . , and (6, 1) to (6, 4), respectively.

When the voltage pulses are applied again to the image sensor 1, the intermediate register 8 and the storage 3, the charges in each row of the photocells are transferred by one row. The charges which has been obtained by adding the charges accumulated during exposure in the rows of photocells indicated by (1, 1) to (1, 4) and (2, 1) to (2, 4) and which is now stored in the single array of transfer cells of the intermediate register 8 indicated by (1) to (4) are transferred to a row of the memory cells of the storage 3 which are indicated by [5, 1] to [5, 4], respectively. The charges in the row of photocells indicated by (1, 1) to (1, 4) each corresponding to the sum of the charges obtained during exposure in the rows of photocells indicated by (3, 1) to (3,4) and (4, 1) to (4, 4) are transferred to the array of transfer cells (of the intermediate register 8) indicated by (1) to (4). The charges in the rows of photocells indicated by (2, 1) to (2, 4), . . . , and (6, 1) to (6, 4) corresponding to the charges obtained during exposure in the rows of photocells indicated by (5, 1) to (5, 4), . . . , and (9, 1) to (9, 4) are transferred to the rows of photocells indicated by (1, 1) to (1, 4), . . . , and (5, 1) to (5, 4), respectively.

When two voltage pulse application modes are alternately performed, in one mode the voltage pulse being applied only to the image sensor 1 and in the other mode the voltage pulse being applied to the image sensor 1, the intermediate register 8 and the storage 3, the charge accumulated during exposure in the (2n-1)th row and the 2nth row (n=1, 2, 3, . . . ) of the photocells of the image sensor 1 are added together in the row of the photocells indicated by (1, 1) to (1, 4). Thereafter, the sums of charge are stored in the nth row of memory cells of the storage 3. For example, the sums of charge obtained by adding the charges in the two rows of photocells indicated by (1, 1) to (1, 4) and (2, 1) to (2, 4) are stored in the row of the memory cells indicated by [1, 1] to [1, 4]. The sums of charge obtained by adding the charges in the two rows of photocells indicated by (3, 1) to (3, 4) and (4, 1) to (4, 4) are stored in the row of memory cells indicated by [2, 1] to [2, 4]. The sums of charge obtained by adding the charges in the two rows of photocells indicated by (5, 1) to (5, 4) and (6, 1) to (6, 4) are stored in the row of memory cells indicated by [3, 1] to [3, 4]. The sums of charge obtained by adding the charges in the two rows of photocells indicated by (7, 1) to (7, 4) and (8, 1) to (8, 4) are stored in the row of memory cells indicated by [4, 1] to [4, 4]. It should be noted that the charges in the row of photocells indicated by (9, 1) to (9, 4) are stored in the row of memory cells indicated by [5, 1] to [5, 4].

Then, the operation proceeds to the storage and transfer modes M-2' and M-3 to perform exposure and storage of data for the second field and also to sequentially transfer the charges stored in the storage 3 in the manner as described above to the horizontal output register 5 where the transferred charges are in turn shifted in the horizontal direction. The charges are then amplified as voltage data by the amplifier 7. As a result, the first field data is read out.

When the readout operation of the first field data is completed, the charges accumulated in the image sensor 1 during the storage mode M-2' are transferred to the storage 3 in the transfer mode M-4. In this case, the sums of charge for the second field are obtained from two rows of photocells which are slid by one row from the two rows used in the first field data transfer/addition operation.

The second field charge signals are then stored in the following manner. The voltage pulses are applied to the image sensor 1, the intermediate register 8 and the storage 3 so as to transfer the charges in each row by one row. The charges obtained during exposure in the rows of photocells indicated by (1, 1) to (1, 4), (2, 1) to (2, 4), . . . , and (9, 1) to (9, 4) are transferred to the array of transfer cells of the intermediate register 8 which are indicated by (1) to (4) and to the rows of photocells indicated by (1, 1) to (1, 4), . . . , and (8, 1) to (8, 4), respectively.

As next step, the voltage pulses are applied only to the image sensor 1 the transfer the charges again by one row within the image sensor 1. The charges in the row of photocells indicated by (2, 1) to (2, 4) which correspond to the charges obtained during exposure in the row of photocells indicated by (3, 1) to (3, 4) are transferred to the row of photocells indicated by (1, 1) to (1, 4). This transferred charges are added to the charges which are obtained during exposure in the row of photocells indicated by (2, 1) to (2, 4) and has been previously transferred to the row of photocells indicated by (1, 1) to (1, 4). The sums of charge are thus stored in the row of photocells indicated by (1, 1) to (1, 4). Furthermore, the charge in the rows of photocells indicated by (3, 1) to (3, 4), . . . , and (8, 1) to (8, 4), respectively, which correspond to the charges obtained during exposure in the rows of photocells (4, 1) to (4, 4), . . . , and (9, 1) to (9, 4), respectively, are transferred to the rows of photocells indicated by (2, 1) to (2, 4), . . . , and (7, 1) to (7, 4), respectively.

When the voltage pulses are applied again to the image sensor 1, the intermediate register 8, and the storage 3, the charges which are stored in the row of transfer cells (of the intermediate register 8) indicated by (1) to (4) and which correspond to the charges obtained during exposure in the row of photocells (of the image sensor 1) indicated by (1, 1) to (1, 4) are stored in the memory cells (of the storage 3) indicated by [5, 1] to [5, 4]. The charges in the row of photocells indicated by (1, 1) to (1, 4) which are the sum of charges obtained during exposure in the two rows of photocells indicated by (2, 1) to (2, 4) and (3, 1) to (3, 4) are transferred to the array of transfer (of the intermediate register 8) cells indicated by (1) to (4). The charges which are stored in the rows of photocells indicated by (2, 1) to (2,4), . . . , and (7, 1) to (7, 4) and which correspond to the charges signals obtained during exposure in the photocells indicated by (4, 1) to (4, 4), . . . , and (9, 1) to (9, 4) are transferred to the rows of photocells indicated by (1, 1) to (1, 4), . . . , and (6, 1) to (6, 4), respectively.

When the voltage pulses are applied only to the image sensor 1, the charges in the row of photocells indicated by (2, 1) to (2, 4) which correspond to the charges obtained during exposure in the row of photocells (5, 1) to (5, 4) are transferred to the row of photocells indicated by (1, 1) to (1, 4). These charges are then added to the charges which are obtained during exposure in the row of photocells (4, 1) to (4, 4) and which has been previously transferred to the row of photocells indicated by (1, 1) to (1, 4). At this time, the charges in the rows of photocells (3, 1) to (3, 4), . . . , and (6, 1) to (6, 4) which correspond to the charges obtained during exposure in the rows of photocells indicated by (6, 1) to (6, 4), . . . , and (9, 1) to (9, 4) are transferred to the rows of photocells indicated by (2, 1) to (2, 4), . . . , and (5, 1) to (5, 4), respectively.

When two voltage pulse application modes are alternately performed in one mode the voltage pulse being applied only to the image sensor 1 and in the other mode the voltage pulse being applied to the image sensor 1, the intermediate register 8 and the storage 3, the charges accumulated during exposure in the (2n-2)th row and the (2n-1)th row (n=1, 2, 3, . . . ) of photocells of the image sensor 1 are added together in the row of photocells indicated by (1, 1) to (1, 4). Thereafter, the sums of charge are stored in the nth row of the memory cells of the storage 3. For example, the charges in the row of photocells indicated by (1, 1) to (1, 4) are stored in the row of memory cells indicated by [1, 1] to [1, 4]. The sums of charge obtained by adding the charges in the two rows of photocells indicated by (2, 1) to (2, 4) and (3, 1) to (3, 4) are stored in the row of memory cells indicated by [2, 1] to [2, 4]. The sums of charge obtained by adding the charges in the two rows of photocells indicated by (4, 1) to (4, 4) and (5, 1) to (5, 4) are stored in the row of memory cells indicated by [3, 1] to [3, 4]. The sums of charge obtained by adding the charges in the two rows of photocells indicated by (6, 1) to (6, 4) and (7, 1) to (7, 4) are stored in the row of memory cells indicated by [4, 1] to [4, 4]. It should be noted that the sums of charge obtained by adding the charges formed in the rows of photocells indicated by (8, 1) to (8, 4) and (9, 1) to (9, 4) are stored in the row of memory cells indicated by [5, 1] to [5, 4].

Then, the operation proceeds to the storage and transfer modes M-2 and M-3' to perform the exposure and storage of data for the first field and also to sequentially transfer the charges stored in the storage 3 in the manner as described above to the horizontal output register 5 where the transferred charges are in turn shifted in the horizontal direction. The signals are then amplified as voltage data by the amplifier 7. As a result, the second field data is read out.

As may be apparent from the above description, when the charges formed in the image sensor 1 are transferred to the storage 3 with adding the charges in two rows by using the last row of photocells indicated by (1, 1) to (1, 4), the two rows in the second field are slid by one row from the two arrays in the first field, thereby obtaining effectively interlaced two fields. The image pick-up device can be thus applied to a movie video system. Furthermore, the image pick-up sensitivity is greatly improved. The addition of charges is performed within the image sensor 1 which has the anti-blooming means of the overflow drain gate OG and the overflow drain OD for every predetermined row. Even if overflow occurs, the overflow component is absorbed by the anti-blooming means, thereby eliminating blooming.

The mode of operation of the image pick-up device FCD when it is applied to a still video system will now be described. An all clear mode S-1 shown in FIG. 4(b) corresponds to the all clear mode M-1 for clearing unnecessary charge. In an exposure/storage mode S-2, the image sensor 1 is exposed to accumulate charge therein. In readout modes S-3 and S-4, data of the first field (odd field) and the second field (even field) are read out, respectively.

A shutter (not shown) disposed in front of the image sensor 1 of the image pick-up device FCD is opened to expose the image sensor 1 to light in the exposure/storage mode S-2 after the all clear mode S-1 is ended.

When a predetermined exposure time interval has elapsed, the shutter is closed, and the readout mode S-3 is initiated. In the readout mode S-3, charges accumulated in the arrays of photocells of the image sensor 1 are sequentially transferred by a single row. More particularly, voltage pulses are applied to the image sensor 1, the intermediate register 8 and the storage 3 one at a time. The charges accumulated in the nine rows of photocells (1, 1) to (1, 4), (2, 1) to (2, 4), . . . , and (9, 1) to (9, 4) are transferred to the row of transfer cells (of the intermediate register 8) indicated by (1) to (4) and to the rows of photocells (of the image sensor 1) indicated by (1, 1) to (1, 4), . . . , and (8, 1) to (8, 4), respectively. Thereafter, when four consecutive voltage pulses which correspond to the number of transfer cells are applied only to the intermediate register 8, the charges obtained during exposure in the row of photocells indicated by (1, 1) to (1, 4) which has been previously transferred to the row of transfer cells indicated by (1) to (4) are horizontally transferred to the output amplifier 10. The charges supplied to the output amplifier 10 is converted to a voltage. In the above manner, the first line signal of the first field (odd field) is obtained.

Thereafter, the charges in the photocells of the image sensor 1 are transferred by two rows. In this case, two voltage pulses are applied to the image sensor 1 and the intermediate register 8, while one voltage pulse is applied to the storage 3. The charges obtained during exposure in the row of photocells indicated by (2, 1) to (2, 4) which has been previously transferred to the row of photocells indicated by (1, 1) to (1, 4) are transferred to the row of memory cells indicated by [5, 1] to [5, 4] through the transfer cells indicated by (1) to (4). Meanwhile, the charges obtained during exposure in the row of photocells indicated by (3, 1) to (3, 4) which has been previously transferred to the row of photocells indicated by (2, 1) to (2, 4) are transferred to the array of transfer cells indicated by (1) to (4). The charges obtained during exposure in the rows of photocells indicated by (4, 1) to (4, 4), . . . , and (9, 1) to (9, 4), respectively, which have been previously transferred to the arrays of photocells indicated by (3, 1) to (3, 4), . . . , and (8, 1) to (8, 4), respectively, are transferred to the rows of photocells indicated by (1, 1) to (1, 4), . . . , and (6, 1) to (6, 4), respectively. Thereafter, in the same manner as previously described, four voltage pulses are applied to the intermediate register 8 so that the charges obtained during exposure in the row of photocells indicated by (3, 1) to (3, 4) are horizontally transferred and supplied to the amplifier 10. The amplifier 10 produces a voltage corresponding to the charges.

In the same manner as described above, charges are vertically transferred by two rows in the image sensor 1 and changes are vertically transferred by a single row in the storage 3. At the same time, the charges transferred to the intermediate register 8 are read out. As a result, the charges obtained during exposure in the rows of photocells indicated by (1, 1) to (1, 4), (3, 1) to (3, 4), (5, 1) to (5, 4), (7, 1) to (7, 4) and (9, 1) to (9, 4) are sequentially read out as voltages. In other words, the data of the first field (odd field) are sequentially read out. Meanwhile, the charges obtained during exposure in the rows of photocells indicated by (2, 1) to (2, 4), (4, 1) to (4, 4), (6, 1) to (6, 4) and (8, 1) to (8, 4) are transferred to the rows of memory cells indicated by [2, 1] to [2, 4], [3, 1] to [3, 4], [4, 1] to [4, 4], and [5, 1] to [5, 4], respectively.

As described above, when the readout operation of the first field data is completed, the readout mode S-4 shown in FIG. 4(b) is initiated. The charges of every row of memory cells of the storage 3 are transferred by one row, and then are sequentially read out through the horizontal output register 5 one at a time. The charges obtained during exposure in the rows of photocells indicated by (2, 1) to (2, 4), (4, 1) to (4, 4), (6, 1) to (6, 4) and (8, 1) to (8, 4) are respectively converted by the amplifier 7 to voltages and are read out. Thus, the readout operation of the second field (even field) is performed.

According to the above-mentioned image pick-up device FCD, as a function corresponding to a frame recording in the two fields-one frame still video system, the video signals of one frame which are formed in the image sensor at a single moment can be read out in the same manner as in the general television system wherein the first field signals and then the second field signals are separately read out.

Figure 5:
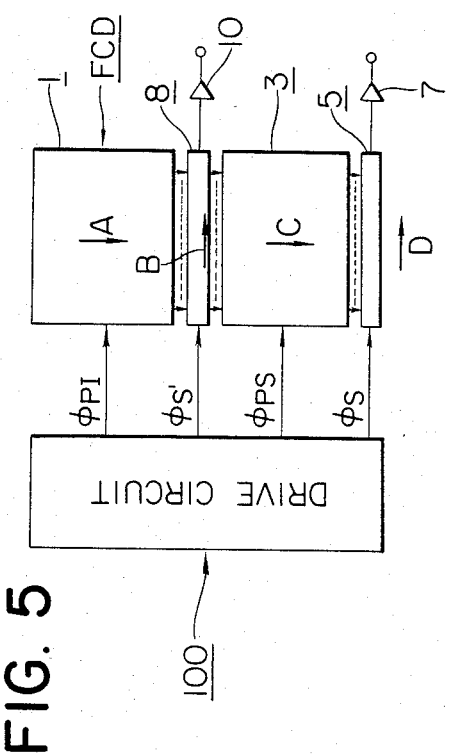
FIG. 5 is a schematic view showing the image pick-up system which comprises a drive circuit and the image pick-up device according to the embodiment of the present invention, shown in FIG. 1.

A drive circuit for driving the image pick-up device FCD so as to perform the above-mentioned operation will be described with reference to FIG. 5. FIG. 5 shows an image pick-up system which includes the image pick-up device FCD. The same reference numerals used with reference to the device FCD in FIG. 1 denote the same parts as in FIG. 1. A drive circuit 100 produces clock pulses $\phi_{PI}$, $\phi_{S'}$, $\phi_{PS}$ and $\phi_S$. Here assume that the number of horizontal pixels (row photocells) is 785, and that the number of vertical pixels (column photocells) is 490. The pulse $\phi_{S'}$ is applied to the poly-Si electrode 30 (FIG. 3) of the image sensor 1. The pulse $\phi_{S'}$ is applied to the poly-Si electrode 31 (FIG. 3) of the intermediate register 8 which has 785 bits and two additional dummy bits. The pulse $\phi_{PS}$ is applied to the poly-Si electrode 32 (FIG. 3) of the storage 3 which has a 785×245 matrix (785 row memory cells×245 column memory cells). The pulse $\phi_S$ is applied to the poly-Si electrode 33 of the horizontal output register 5 which has 785 bits and two additional dummy bits. In this embodiment, the pulses $\phi_{PI}$, $\phi_{S'}$, $\phi_{PS}$ and $\phi_S$ vary between $-15$ V as the reference voltage and 0 V.

Now assume that the image pick-up device FCD performs the movie mode for continuously obtaining 2-field interlaced frame signals, and that the image pick-up device FCD performs the still mode for obtaining interlaced frame signals whose two fields are not lagged from each other. In the movie mode, the interlaced field signals for every 1/60 second most be obtained in the same manner as in the general television camera if the NTSC color television system is presumed. On the other hand, in the still mode, the two fields-one frame signals must be obtained so as not to delay the even field from the immediately preceding odd field.

Figure 6:
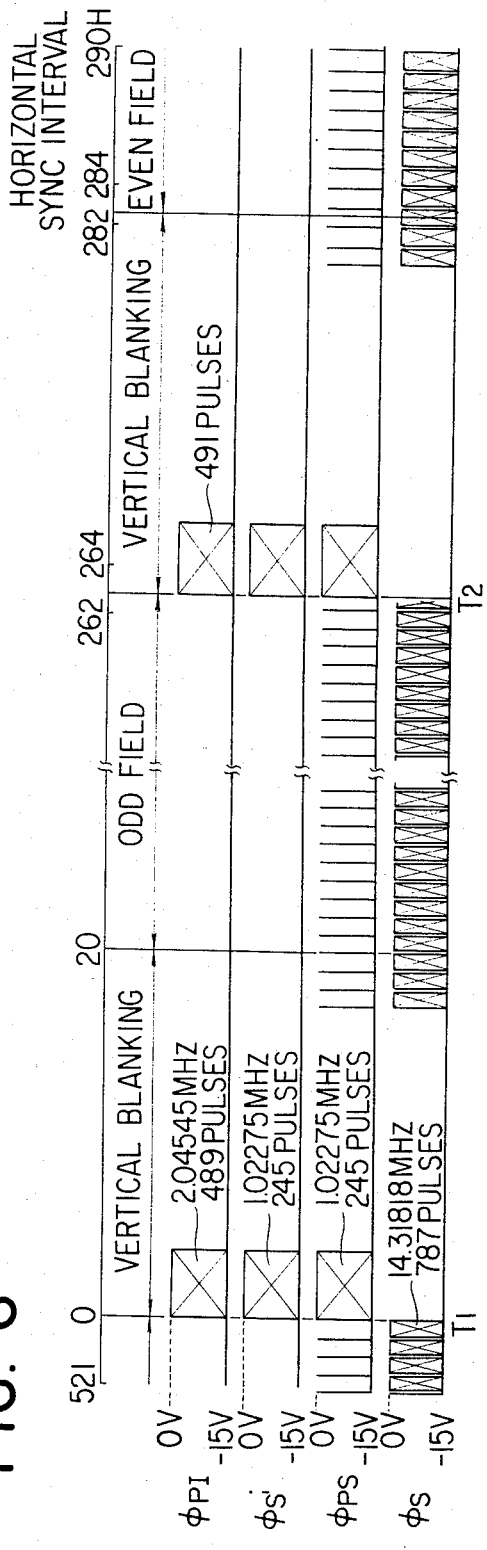

The timings of the clock pulses $\phi_{PI}$, $\phi_{S'}$, $\phi_{PS}$ and $\phi_S$ applied from the drive circuit 100 to the image pick-up device FCD will be described with reference to FIGS. 6, 7 and 8. FIG. 6 shows the vertical timing of the clock pulses; FIG. 7 shows the detailed vertical timing thereof; and FIG. 8 shows the horizontal timing thereof.

The timing of the pulses will be described from time $T_1$ at which an exposure time interval of 1/60 second has elapsed. 489 clock pulses $\phi_{PI}$ which have a frequency of 2.04545 MHz are applied from the drive circuit 100 to the image sensor 1. 245 clock pulses $\phi_S$, which have a frequency of 1.02275 MHz are applied to the intermediate register 8; and 245 clock pulses $\phi_{PS}$ which has a frequency of 1.02275 MHz are applied to the storage 3. The drive circuit 100 also supplies the 14.318118-MHz pulses $\phi_S$ to the horizontal output register 5. The composite line signals which are obtained by adding every two line signals stored in the (2n-1)th row and the 2nth row of photocells of the image sensor 1 and which correspond to 245 lines are stored in the storage 3. At the same time, the horizontal output register 5 is cleared. It should be noted that the transfer clock pulses have frequencies of 2.04545 MHz and 1.02275 MHz so as to decrease an influence of smearing since the image sensor 1 is exposed even during the transfer operation. It is preferred that high frequencies are used for the abovementioned frequencies. The frequency of the clock pulse $\phi_{PI}$ applied to the image sensor 1 is twice that of the clock pulses $\phi_S$, and $\phi_{PS}$ respectively applied to the intermediate register 8 and the storage 3, as may be apparent from the above description. Due to the frequency of pulse $\phi_{PI}$, a single line transfer is performed in the intermediate register 8 and the storage 3 during two line transfer in the image sensor 1, thereby the sum of charges of two lines in the image sensor 1 being transferred to the storage 3.

Thereafter, as shown in FIG. 8, one clock pulse $\phi_{PS}$ and one clock pulse $\phi_S$ are applied from the drive circuit 100 to the storage 3 and the horizontal output register 5 so as to transfer the first line signal in the storage 3 to the horizontal output register 5 during the horizontal blanking interval three horizontal sync intervals after the vertical blanking period. When 787 clock pulses $\phi_S$ having the frequency of 14.31818 MHz have been applied from the drive circuit 100 to the horizontal output register 5, the first horizontal scanning line (the ninth line of the odd field at the television rate) signals are read out.

During the horizontal blanking interval, one clock pulse $\phi_{PS}$ and one clock pulse $\phi_S$ are respectively applied from the drive circuit 100 to the storage 3 and the horizontal output register 5, and the second line signal in the storage 3 is transferred to the horizontal output register 5. Thereafter, in the same manner as described above, when 787 clock pulses $\phi_S$ having the frequency of 14.31818 MHz have been applied from the drive circuit 100 to the horizontal output register 5, the second horizontal scanning line signals are read out.

The above operation is repeated 245 times. The field signals of the odd field can thus be read out from the horizontal output register 5 in 1/60 second or so.

While the field signals for the odd field have been read out from the storage 3, the clock pulse $\phi_{PI}$ is not applied from the drive circuit 100 to the image sensor 1. Therefore, the line signals for the next even field are stored in the image sensor 1.

At time $T_2$ (FIG. 6) when the time interval of 1/60 second has elapsed since time $T_1$, 491 clock pulses $\phi_{PI}$ having the frequency of 2.04545 MHz are applied from the drive circuit 100 to the image sensor 1; 245 clock pulses $\phi_{PS}$ having the frequency of 1.02275 MHz are applied from the drive circuit 100 to the storage 3; and 245 clock pulses $\phi_{S'}$ having the frequency of 1.02775 MHz are applied from the drive circuit 100 to the intermediate register 8, 245 composite line signals obtained by adding together every two line signals stored in the (2n-2)th array and the (2n-1)th array are stored in the storage 3. In this case, the clock pulses $\phi_{PS}$ and $\phi_{S'}$ respectively applied from the drive circuit 100 to the storage 3 and the intermediate register 8 have inverted phases from those of the clock pulses $\phi_{PS}$ and $\phi_S$, applied to read out the odd field signals (FIG. 7).

Thereafter, when the vertical blanking interval has elapsed, every line signal in the storage 3 is read out and transferred to the horizontal output register 5 in synchronism with the horizontal sync interval. At the same time, the clock pulses $\phi_S$ having the frequency of 14.318181 MHz are applied from the drive circuit 100 to the horizontal output register 5 to read out the even field signals in the same manner as for the odd field signals.

Figure 10:
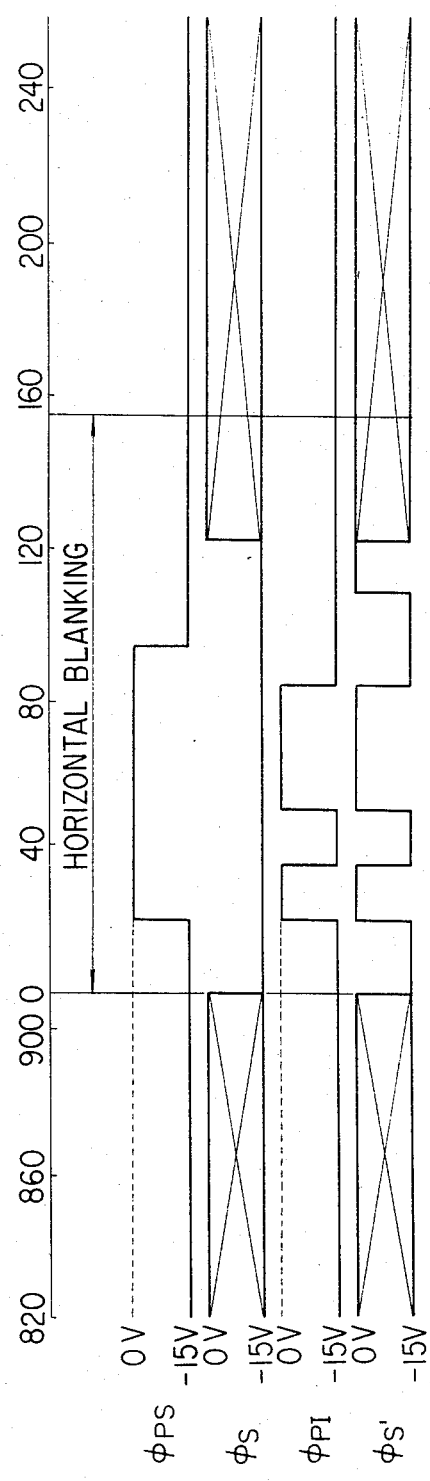

The timing of the clock pulses $\phi_{PI}$, $\phi_{S'}$, $\phi_{PS}$ and $\phi_S$ applied from the drive circuit 100 to the image pick-up device FCD in the still mode will be described with reference to FIGS. 9 and 10. FIG. 9 shows the vertical timing of the clock pulses; and FIG. 10 shows the horizontal timing thereof.

When the image sensor 1 is properly exposed by an exposure control unit (not shown), the line signals corresponding to the image are stored in the image sensor 1.

Thereafter, at time T₃ shown in FIG. 9 (i.e., during the horizontal blanking interval three horizontal sync intervals after the vertical blanking interval), one clock pulse $\phi_{PI}$, one clock pulse $\phi_S$, and one clock pulse $\phi_{PS}$ are respectively supplied from the drive circuit 100 to the image sensor 1, the intermediate register 8 and the storage 3 so as to transfer the first line signal (corresponding to the ninth line signal at the television rate) of the image sensor 1 to the intermediate register 8. Thereafter, during the horizontal sync interval, when 787 clock pulses $\phi_S$, having the frequency of 14.318181 MHz have been applied from the drive circuit 100 to the intermediate register 8, the first line signal of the odd field is read out through the intermediate register 8.

As described above, when the readout operation of one line is completed and the next horizontal blanking interval is started, the second line signal of the image sensor 1 is transferred to the storage 3. At the same time, two clock pulses $\phi_{PI}$, two clock pulses $\phi_S$, and one clock pulse $\phi_{PS}$ are respectively applied from the drive circuit 100 to the image sensor 1, the intermediate register 8 and the storage 3 so as to transfer the third line signal of the image sensor 1 to the intermediate register 8.

When 787 clock pulses $\phi_S$, having the frequency of 14.318181 MHz have been applied from the drive circuit 100 to the intermediate register 8, the second line signal of the odd field is read out.

The above-described operation is repeated (i.e., the odd line signals of the image sensor 1 are transferred to the intermediate register 8 during the horizontal blanking interval as the even line signals are transferred to the storage 3, and the line signals transferred to the intermediate register 8 are read out during the subsequent horizontal sync interval), so that the line signals of the odd field can be obtained from the intermediate register 8. At the same time, the line signals of the even field are stored in the storage 3. During the above operation, the clock pulses $\phi_S$ having the frequency of 14.31818 MHz are continuously applied from the drive circuit 100 to the horizontal output register 5 so as to clear the horizontal output register 5.

When the readout operation of the odd field signals is completed, and a short period of time has elapsed three horizontal scanning intervals after the predetermined vertical blanking interval, the readout operation of the even field signals is started at time T₄ in FIG. 9. This readout operation is performed such that the line signal is read out from the horizontal output register 5 while another line signal is being transferred from the storage 3 to the horizontal output register 5. One clock pulse $\phi_{PS}$ and one clock pulse $\phi_S$ are respectively applied from the drive circuit 100 to the storage 3 and the horizontal output register 5 during the horizontal blanking interval. The line signal is then transferred from the storage 3 to the horizontal output register 5. During the next horizontal sync interval, 787 clock pulses $\phi_S$ having the frequency 14.31818 MHz are applied from the drive circuit 100 to the horizontal output register 5. The above operation is repeated to obtain the signals of the even field through the horizontal output register 5.

In the still mode, during the readout operation of the even field, the signals corresponding to the next image can be stored in the image sensor 1. The shutter is opened for a predetermined time interval (1/60 second or shorter) to expose the image sensor 1. Therefore, the data of next odd field can be immediately read out. In other words, 30 still frame images can be continuously obtained within one second.

The drive circuit 100 will be described in detail with reference to FIG. 11.

Figure 11:
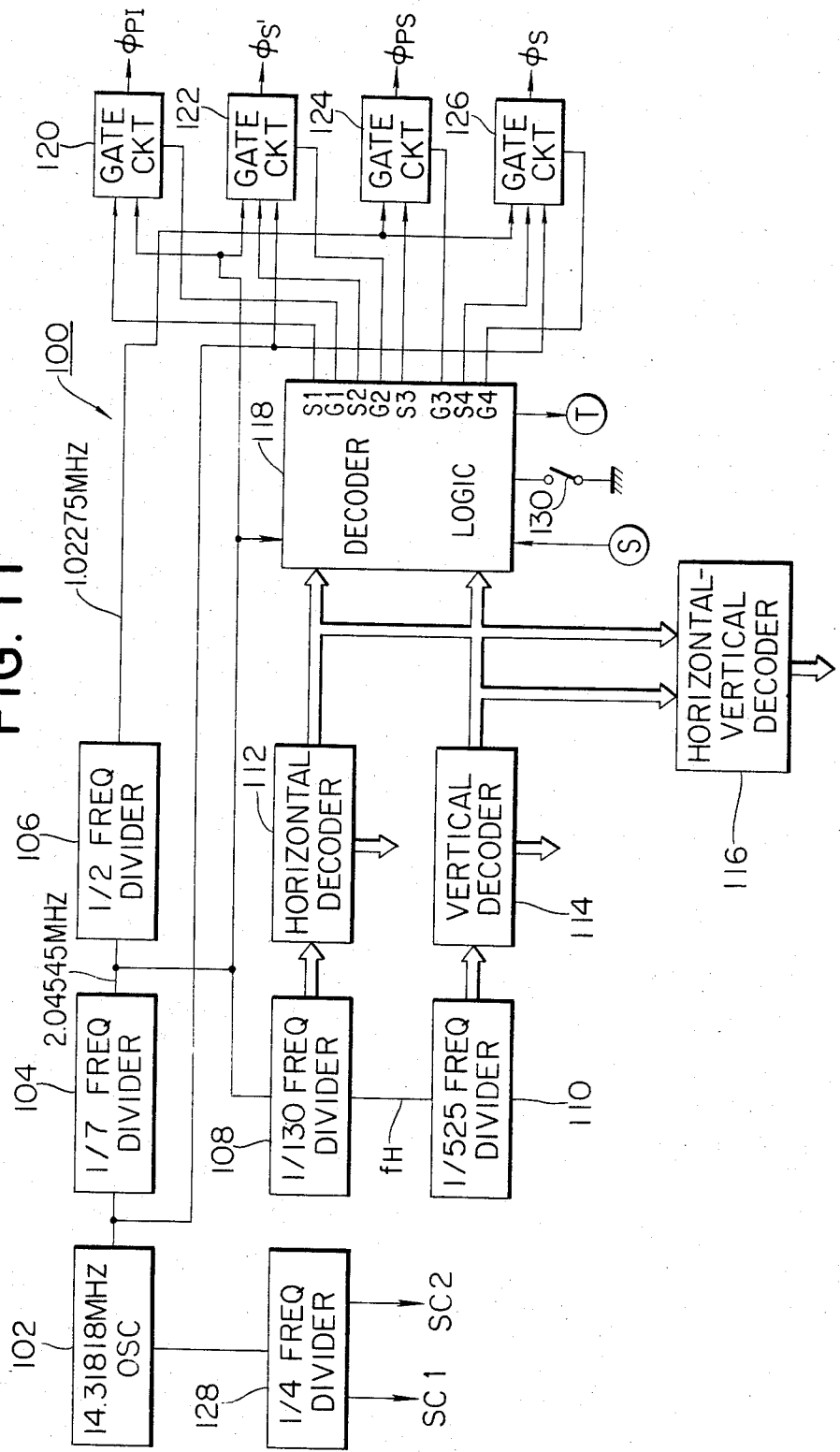
FIG. 11 is a block diagram of the drive circuit shown in FIG. 5.

Referring to FIG. 11, an oscillator (OSC) 102 oscillates a signal having a frequency of 14.31818 MHz (this frequency is four times that of the chrominance subcarrier in the standard NTSC system). A 1/7 frequency divider 104 7-divides the frequency of the oscillation signal from the oscillator 102 so as to produce a clock having a frequency of 2.04545 MHz. A ½ frequency divider 106 2-divides the frequency of the divided signal from the 1/7 frequency divider 104 so as to generate a clock having a frequency of 1.02275 MHz. A 1/130 frequency divider 108 130-divides the frequency of the divided signal from the 1/7 frequency divider 104 so as to generate divided signals for one horizontal sync interval $f_H$. A 1/525 frequency divider 110 525-divides the frequency of the divided signal from the 1/130 frequency divider 108 so as to generate divided signals for one vertical sync interval $f_V$. A horizontal decoder 112 generates various pulses such as a horizontal sync pulse, a horizontal blanking pulse, an equivalent pulse, and a burst/flag pulse which are required for a known television signal processing circuit. These various pulses are generated on the basis of the divided signals from the 1/130 frequency divider 108. A vertical decoder 114 generates various pulses such as a vertical sync signal and a vertical blanking signal which are required for the known television signal processing circuit. These various pulses are generated on the basis of the divided signals from the 1/525 frequency divider 110. A horizontal-vertical decoder 116 generates pulses such as a composite sync pulse and a composite blanking pulse which correspond to the television rate on the basis of the output signals from the horizontal decoder 112 and the vertical decoder 114. A decoder logic 118 is operated in accordance with the output signals from the horizontal decoder 112 and the vertical decoder 114, the switching state of a switch 130 for selecting one of the movie and still modes, and a storage start command Ⓢ, so as to generate pulses G1, G2, G3 and G4 for respectively controlling gate circuits 120, 122, 124 and 126 and to generate original clock pulses S1 to S4. The gate circuits 120 to 126 are thus operated on the basis of the gate signals G1 to G4 from the decoder logic 118 and the divided signals from the 1/7 frequency divider 104 and the ½ frequency divider 106 so as to selectively invert the input signals as needed. A ¼ frequency divider 128 4-divides the oscillation signal from the oscillator 102 to generate chrominance subcarriers $SC_1$ and $SC_2$ (the phases of these subcarriers are shifted by 90°).

In the circuit arrangement of the drive circuit 100 as described above, the outputs from the horizontal decoder 112, the vertical decoder 114, the horizontal-vertical decoder 116 and the ¼ frequency divider 128 are supplied to a known video signal processing system, a servo circuit system, a recording gate, and a head selection control system.

As may be apparent from the above description, the decoder logic 118 serves to determine one of the movie and still modes in accordance with the switched state of the switch 130.

In the movie mode, when the decoder logic 118 supplies the clock pulses S1 to S4 and the gate pulses G1 to G4 to the gate circuits 120 to 126, the gate circuits 120 to 126 generate the clock pulses $\phi_{PI}$, $\phi_{S'}$, $\phi_{PS}$ and $\phi_S$, respectively, in synchronims with the television signal interval, as shown in FIGS. 6 to 8.

On the other hand, in the still mode, the decoder logic 118 supplies the clock pulses S1 to S4 and the gate pulses G1 to G4 to the gate circuits 120 to 126 so as to intermittently or continuously generate the clock pulses $\phi_{PI}$, $\phi_{S'}$, $\phi_{PS}$ and $\phi_S$, respectively, in accordance with the storage command ⓢ, as shown in FIGS. 9 and 10. It should be noted that a shutter control sync signal ⓣ is supplied to a shutter control circuit (not shown) in the still mode.

Figure 12:
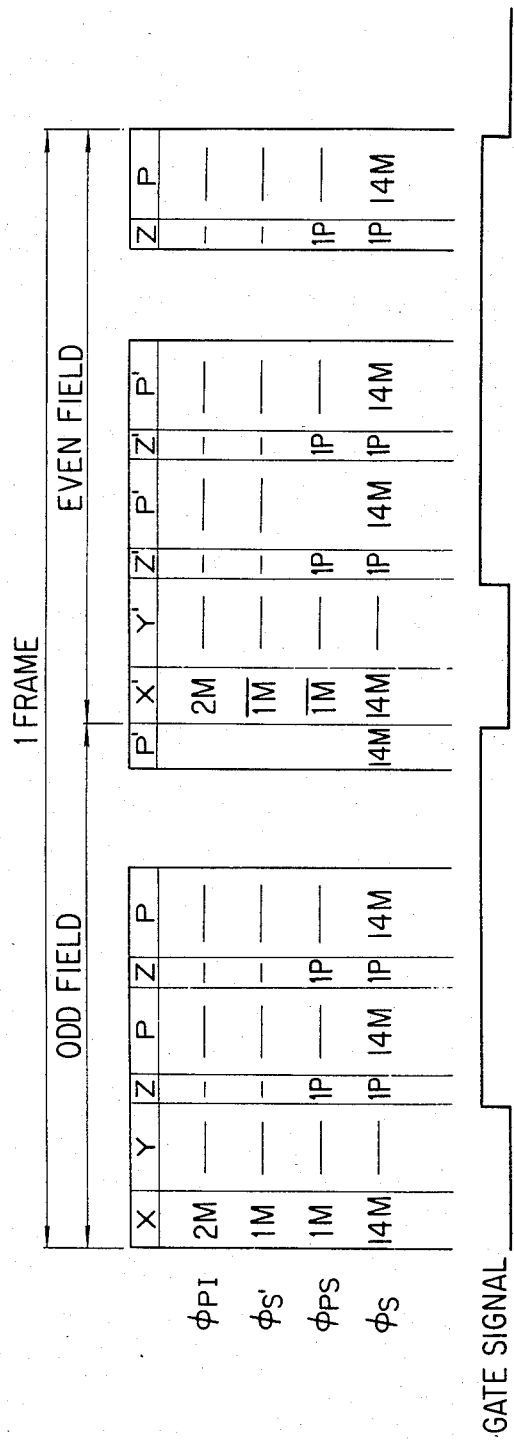
FIGS. 12 and 13 are representations for explaining the generating conditions of control signals, respectively.
Figure 13:
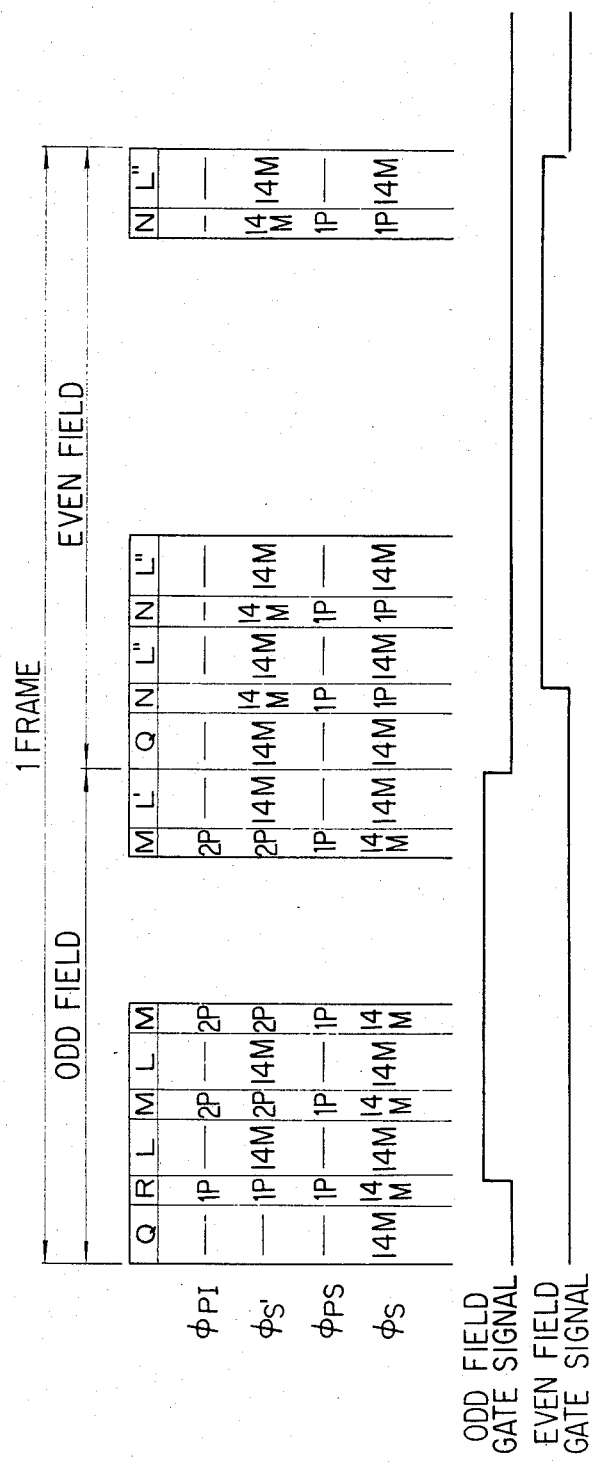
Figure 14:
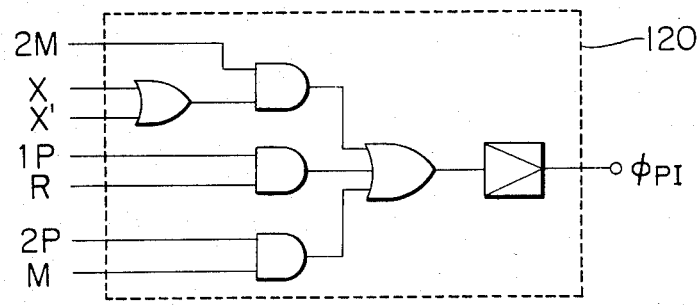
FIGS. 14, 15, 16 and 17 are block diagrams of four gate circuits shown in FIG. 11, respectively.
Figure 15:
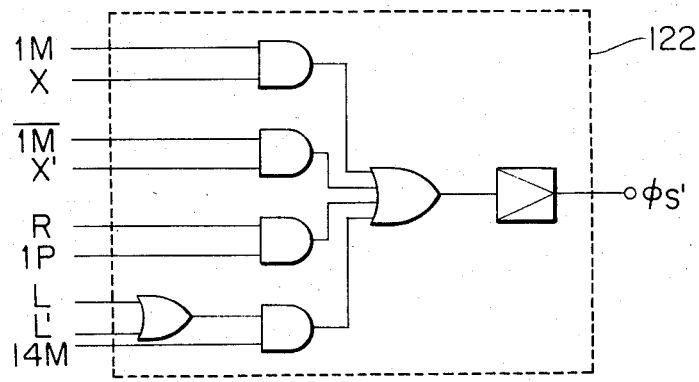
Figure 16:
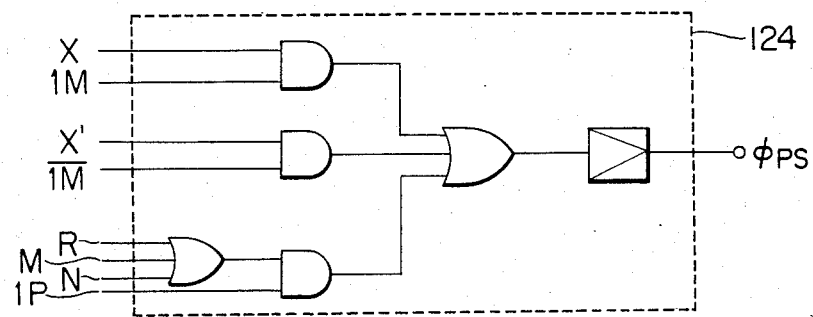
Figure 17:
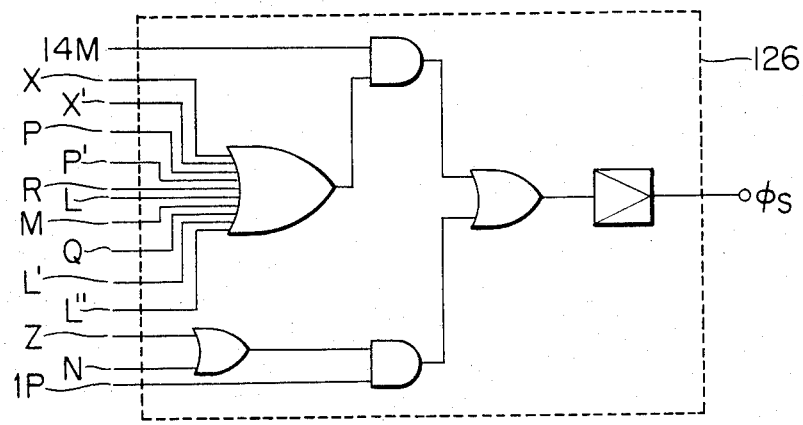

The operation of the decoder logic 118 (FIG. 11) in the movie mode and that in the still mode will be described hereinafter. FIGS. 12 and 13 show sequences of the clock pulses $\phi_{PI}$, $\phi_{S'}$, $\phi_{PS}$ and $\phi_S$ in the movie and still modes, respectively.

The operation of the decoder logic 118 in the movie mode will be described with reference to FIG. 12. The decoder logic 118 has six operating modes X, Y, Z, P, P' and X' for one-frame television signal. In the odd field, the operating modes are switched in the order of X, Y, Z, P, Z, P, ..., Z, and P'; in the even field, the operating modes are switched in the order of X', Y, Z, P, Z, ..., P and Z. Referring to FIG. 12, a clock pulse 2M has a frequency of 2.04545 MHz. A clock pulse 1M has a frequency of 1.02275 MHz. A clock pulse $\overline{1M}$ has a phase inverted by 180° from that of the clock pulse 1M. A clock pulse 14M has a frequency of 14.31818 MHz. One pulse is designated by 1P; and two pulses are designated by 2P. In the operating mode X, the clock pulse 2M as the clock pulse $\phi_{PI}$, the clock pulse 1M as the clock pulse $\phi_{S'}$, the clock pulse $\overline{1M}$ as the clock pulse $\phi_{PS}$, and the clock pulse 14M as the clock pulse $\phi_S$ are generated. A composite line signal obtained by adding the (2n-1)th and 2nth arrays of the image sensor 1 is transferred to and stored in the nth array of the storage 3. The clock pulse 14M is supplied to the horiozntal output register 5 which is then cleared.

In the operating mode Y, all the clock pulses $\phi_{PI}$, $\phi_{S'}$, $\phi_{PS}$ and $\phi_S$ are stopped, so that the line signals are stored in the storage 3 until the beginning of three horizontal sync pulses before the vertical blanking interval is ended.

In the operating mode Z, one clock pulse $\phi_{PS}$ and one clock pulse $\phi_S$ are respectively supplied to the storage 3 and the horizontal output register 5 so as to transfer the line signal from the storage 3 to the horizontal output register 5. Thereafter, in the operating mode P, the clock pulse 14M is supplied as the clock pulse $\phi_S$ to the horizontal output register 5, and scanning signals of the one horizontal sync interval are produced by the horizontal output register 5. The operating modes Z and P are repeated alternately, and the operating mode P' is set in the ½ horizontal sync interval. As a result, the operation for the odd field is completed.

In the operating mode X', the clock pulse 2M as the clock pulse $\phi_{PI}$, the clock pulse $\overline{1M}$ as the clock pulse $\phi_{S}$, the clock pulse $\overline{1M}$ as the clock pulse $\phi_{PS}$ and the clock pulse 14M as the clock pulse $\phi_S$ are generated from the decoder logic 118. The composite logic signal obtained by adding the line signals in the (2n - 2)th and (2n-1)th arrays of the image sensor 1 is transferred to and stored in the nth array of the storage 3. The clock pulse 14M is supplied to the horizontal output register 5 which is then cleared.

The operation in the even field after the operating mode Y is the same as that in the odd field, except that the horizontal readout operation is ended in the operating mode P having one horizontal sync interval.

The valid signals are read out from the horizontal output register 5 only in the operating modes P and P'. As shown in FIG. 12, when the gates are opened only in the operating modes Z, P and P', invalid signals from the horizontal output register 5 can be eliminated. On the other hand, if the signal level of the horizontal output register 5 is required during a no-signal transfer period for checking in consideration of signal processing, the clock pulse 14M is applied to the horizontal output register 5 in the operating mode Y, and a signal read out therefrom can be used for checking the signal level of the register 5.

The operation of the decoder logic 118 in the still mode will be described with reference to FIG. 13. The decoder logic 118 has seven operating modes Q, R, L, M, L', N and L'' for one-frame television signal. In the odd field, the operating modes are switched in the order of Q, R, L, M, ..., L, M and L'; and in the even field, the operating modes are switched in the order of Q, N, L'', N, ..., N and L''.

When the charge storage is completed in the image sensor 1 and a light-shielding means (not shown) shields the image sensor 1, the operating mode Q for the odd field is started. This mode Q continues until the beginning of three horizontal sync pulses before the vertical blanking interval is ended. During this predetermined interval, the clock pulses $\phi_{PI}$, $\phi_{S'}$ and $\phi_{PS}$ are not generated, while the clock pulse $\phi_S$ is generated. Therefore, the horizontal output register 5 is cleared.

When the operating mode R is set, one clock pulse $\phi_{PI}$, one clock pulse $\phi_S$ and one clock pulse $\phi_{PS}$ are generated from the gate circuits 120, 126 and 124, respectively. Meanwhile, the clock pulse 14M is generated as the clock pulse $\phi_S$. In this case, the line signal from the first array of the image sensor 1 is transferred to the intermediate register 8. During this period, the horizontal output register 5 is continuously cleared.

In the operating mode L, the clock pulse 14M is generated as the clock pulse $\phi_{S'}$ by the gate circuit 122. Therefore, the scanning signals for one horizontal scanning period are produced by the intermediate register 8.

In the operating mode M, one clock pulse $\phi_{PS}$ is generated by the gate circuit 124, while two clock pulses $\phi_{PI}$ and two clock pulses $\phi_{S'}$ are generated by the gate circuits 120 and 122, respectively. The line signal from the second array of the image sensor 1 is transferred to the storage 3. At the same time, the line signal from the third array of the image sensor 1 is transferred to the intermediate register 8. Thereafter, in the operating mode L, the clock pulse 14M as the clock pulse $\phi_{S'}$ is supplied to the intermediate register 8 so as to read out the next line signal of the odd field. The operating modes M and L are repeatedly and alternately set, until the readout operation of the scanning signals of the odd field is completed.

In the readout operation for the even field, the clock pulse $\phi_{PI}$ is not supplied from the gate circuit 120 of the drive circuit 100 to the image sensor 1. In this condition, if the shutter is opened, image storage can be performed. Meanwhile, the clock pulse 14M as the clock pulse $\phi_{S'}$ is continuously supplied to the intermediate register 8 which is then cleared.

In the operating mode Q, the clock pulse $\phi_{PS}$ is not supplied to the storage 3, while the clock pulse 14M as the clock pulse $\phi_S$ is supplied to the horizontal output register 5. As a result, the horizontal output register 5 is cleared. This operation is repeated until the beginning of three horizontal sync pulses before the vertical blanking interval is ended.

In the next operating mode N, one clock pulse $\phi_{PS}$ and one clock pulse $\phi_S$ are generated from the gate circuits 124 and 126, respectively. The line signal in the first array of the storage 3 is tarnsferred to the horizontal output register 5. Thereafter, in the operating mode L'', the clock pulse 14M as the clock pulse $\phi_S$ is supplied only to the horizontal output register 5. The scanning signals for one horizontal sync interval can be produced by the horizontal output register 5. The operating modes N and L'' are repeatedly and alternately set. After the operating mode L'' for reading out the last scanning signal for the horizontal sync period is completed, the readout operation of the image signals for the even field is completed.

The valid signals of the odd field are produced by the intermediate register 8 only in the operating modes L and L'. Only during the interval in each of the operating modes L and L', or in each of the operating modes L, M and L' as shown in FIG. 13, the output from the intermediate register 8 is passed, so that the invalid signals may not be supplied from the intermediate register 8. On the other hand, the valid signals of the even field are produced from the horizontal output register 5 only in the operating mode L''. Only during the time interval in this operating mode or in each of the operating modes N and L'', the output from the horizontal output register 5 is passed, so that the invalid signals may not be supplied from the horizontal output register 5. When the output signals from the horizontal output register 5 are mixed with the output signals from the intermediate register 8, the image signals of one frame can be obtained.

In order to perform the above operation, the gate circuits 120 to 126 selectively produce the clock pulse 2M from the 1/7 frequency divider 104, the clock pulse 1M from the ½ frequency divider 106, the clock pulse 14M from the oscillator 102, and the original clock pulses S1 to S4 from the decoder logic 118 which includes the one-pulse signal 1P and the two-pulse signal 2P under the control of the gate pulses G1 to G4 from the decoder logic 118. The arrangements of the gate circuits 120, 122, 124 and 126 are shown in FIGS. 14, 15, 16 and 17, respectively. It should be noted that the one-pulse signal 1P and the two-pulse signal 2P are selectively supplied to the gate circuits shown in FIGS. 14 to 17 at the timings shown in FIGS. 6 to 10 for every mode. Referring to FIGS. 14 to 17, only logic gates are illustrated, and the circuits for controlling the delay in rising and falling times of the clocks (e.g., a sync signal output circuit and a logic circuit for preventing glitch are omitted since these circuit arrangements are known to those who are skilled in the art.

The image-pick up system according to the first embodiment of the present invention has been described hereinabove. An image pick-up device according to a second embodiment of the present invention will be described with reference to FIGS. 18 and 19 for properly performing signal addition in part of the image sensor, thereby improving the effective sensitivity.

Figure 18:
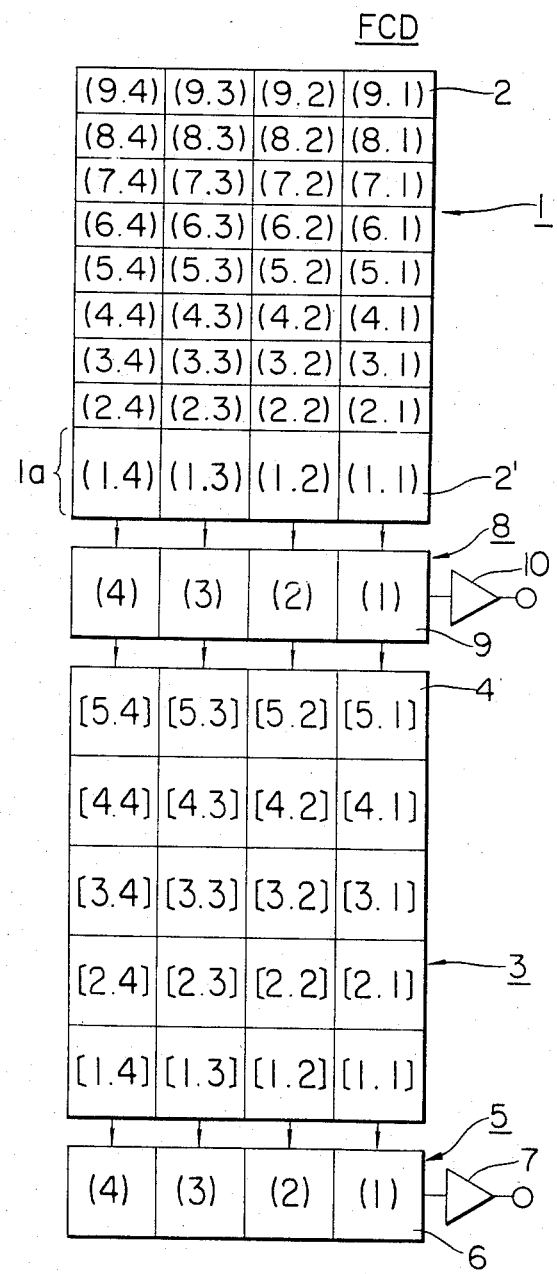
FIG. 18 is a schematic view showing an image pick-up device according to another embodiment of the present invention.
Figure 19:
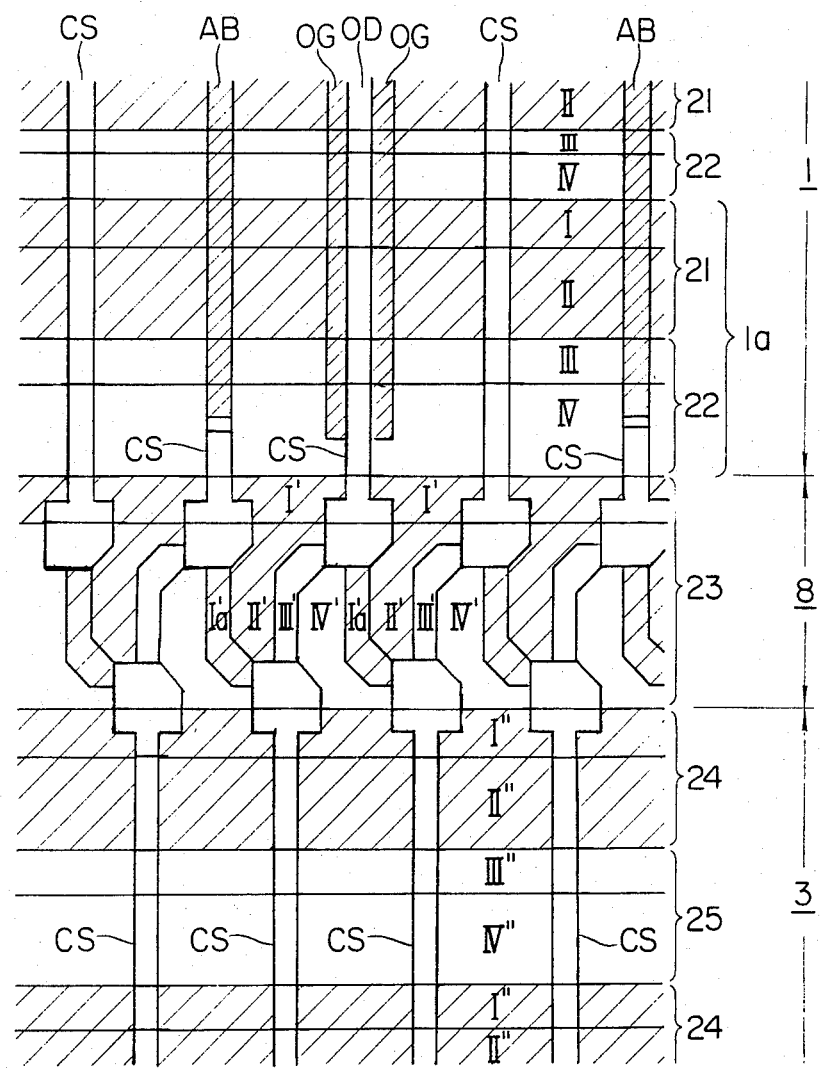
FIG. 19 is a plan view partially showing an image sensor, a storage and an intermediate register serving as a readout/transfer section of the image pick-up device shown in FIG. 18 wherein the readout/transfer section is formed between the image sensor and the storage.

The same reference numerals as used in FIGS. 1 and 2 denote the same parts in FIGS. 18 and 19, and a detailed description thereof will be omitted so as not to hinder understanding of the second embodiment of the present invention.

In an image pick-up device FCD of the second embodiment, each of photocells 2' arranged along the final array or row 1a of a storage 3 (i.e., the photocells used for signal addition) has a storage capacity 1.5 times to twice that of other photocells 2 arranged in an image sensor 1. Each of memory cells 4 of the storage 3, each of transfer cells 9 of an intermediate register 8, and each of transfer cells 6 of a horizontal output register 5 have substantially the same capacity as the photocell 2'. The storage capacity of the photocells 2' of the image sensor 1, the memory cells 4 of the storage 3, and the transfer cells 6 and 9 of the registers 5 and 8 compared to the storage capacity of the photocells 2 effectively serves to increase the effective sensitivity of the image pick-up device FCD in accordance with the composite line signal formed by adding together two line signals. It should be noted that the dimensions of each of the photocells 2', the memory cells 4, and the transfer cells 6 and 9 are larger than those of each of the photocells 2 for illustrative convenience. The actual dimensions of the cells 2', 4, 6 and 9 do not always differ from those of the cells 2. The larger storage capacity may be implemented by any other means. Needless to say, the image pick-up device shown in FIGS. 18 and 19 can be applied to the above-mentioned image pick-up system in the same manner as in the image pick-up device shown in FIGS. 1 and 2.

As a result, in the image pick-up device FCD shown in FIGS. 18 and 19, the effective sensitivity is greatly improved by increasing the allowable amount of signal additions.

As previously described, the signal addition is performed within the image sensor 1 so as to prevent blooming by the anti-blooming means arranged in the image sensor 1 even if an overflow component results from the signal addition or superposition. In this sense, it can be readily understood that the signals need not be added together in the last array 1a of the image sensor 1. However, if the adder means is arranged midway along the rows or arrays of the image sensor 1, the subsequent rows must also have a larger capacity, resulting in inconvenience. It is understood that the array used for signal addition is preferably located at the last row. As a modification, the arrays of the image sensor 1 may be increased by one such that this additional array is used as the adder means and is shielded together with the storage.

According to the image pick-up device and its system as described above, blooming is effectively prevented, and the effective image pick-up sensitivity is greatly improved.

The present invention is not limited to the particular embodiments described above. Various changes and modifications may be made within the spirit and scope of the present invention without departing from the scope of the appended claims. In the above embodiments, the image pick-up devices are used under the assumption of a television system. However, the image pick-up device of the present invention may also be applied to other image pick-up equipment such as a reader.

What is claimed is:

1. A system for generating an electrical indication indicative of an image scansion, comprising in combination:
   (A) image sensing means including a plurality of one-dimensional image sensing arrays arranged in parallel with each other, each of said sensing arrays being for generating an electrical indication indicative of a line scansion of a portion of an image;
   (B) storage means including a plurality of one-dimensional storage arrays arranged in parallel with each other; and
   (C) control means for controlling said image sensing means and said storage means, said control means causing the sensing means to successively form, at a selected one of said sensing arrays, composite electrical indications each being composed of a selected plural number of said line scansion indications and causing the storage means to successively store said composite electrical indications formed by the sensing means.

2. The system according to claim 1, wherein said selected one sensing array at which said composite electrical indications are formed is located at a position near said storage means.

3. The system according to claim 2, wherein said selected one sensing array is located at the position substantially neighboring with the storage means.

4. The system according to claim 1, wherein the number of said one-dimensional storage arrays is fewer than that of said one-dimensional sensing arrays.

5. The system according to claim 4, wherein the number of said one-dimensional storage arrays is nearly equal to one half the number of said one-dimensional sensing arrays.

6. The system according to claim 5, wherein said control means is arranged to cause said sensing means to successively form, at said selected one sensing array, composite electrical indications each being composed of two line scansion indications.

7. The system according to claim 1, wherein said control means is arranged to cause said sensing means to successively form, at said selected one sensing array, composite electrical indications each being composed of two line scansion indications.

8. The system according to claim 1, further comprising:
means for clearing overflow indications of the electrical indications generated in said sensing means.

9. An image pick-up system comprising in combination:
   (A) image pick-up means including an array of a plurality of pick-up elements arranged in columns and rows, each of said elements generating an image element signal corresponding to a received portion of an image and each of said rows of said array being adapted for generating a line signal corresponding to a linear portion of the image, and each element having a storage capacity for storing the generated image element signal, wherein the storage capacity of each of the elements included in a selected row is larger than that of each of the elements included in other rows;
   (B) signal storage means; and
   (C) control means for controlling said image pick-up means and said signal storage means, said control means causing the pick-up means to successively form, at said selected row, composite line signals each being composed of a selected plural number of said line signals and causing said storage means to successively store said composite line signals formed by the pick-up means.

10. The system according to claim 9, wherein said selected row at which said composite line signals are formed is located at a position near said storage means.

11. The system according to claim 10, wherein said selected row is located at the position substantially neighboring with the storage means.

12. The system according to claim 9, wherein said storage means includes an array of a plurality of storage elements arranged in columns and rows, the number of rows of said storage element array being fewer than the number of rows of said pick-up element array in said image pick-up means.

13. The system according to claim 12, wherein the number of rows of said storage element array is nearly equal to one half the number of rows of said pick-up element array.

14. The system according to claim 13, wherein said control means is arranged to cause said pick-up means to successively form, at said selected row, composite line signals each being composed of two line signals.

15. The system according to claim 9, wherein said storage means includes an array of a plurality of storage elements arranged in columns and rows, each of said storage elements having a storage capacity for storing an electrical signal, and the storage capacity of each of the storage elements being nearly equal to that of each of the pick-up elements included in said selected row in said pick-up element array.

16. The system according to claim 15, wherein the storage capacity of each of the pick-up elements included in said selected row is nearly equal to twice the storage capacity of each of the pick-up elements included in said other rows.

17. The system according to claim 16, wherein said control means is arranged to cause said pick-up means to successively form, at said selected row, composite line signals each being composed of two line signals.

18. The system according to claim 17, wherein the number of rows of said storage element array is nearly equal to one half the number of rows of said pick-up element array.

19. The system according to claim 15, wherein the number of rows of said storage element array is fewer than the number of rows of said pick-up element array in said image pick-up means.

20. The system according to claim 15, further comprising:
read-out means for reading out the signals stored in said storage means, said read-out means including an array of a plurality of read-out elements arranged in a row, each of said read-out elements having a storage capacity for storing an electrical signal, and the storage capacity of each of said read-out elements being rearly equal to that of each of said storage elements in said storage means.

21. The system according to claim 9, wherein the storage capacity of each of the pick-up elements included in said selected row is nearly equal to twice the storage capacity of each of the pick-up elements included in said other rows.

22. The system according to claim 21, wherein said control means is arranged to cause said pick-up means to successively form, at said selected row, composite line signals each being composed of two line signals.

23. The system according to claim 9, wherein said control means is arranged to cause said pick-up means to successively form, at said selected row, composite line signals each being composed of two line signals.

24. The system according to claim 9, further comprising:
means for clearing overflow signals of the line signals generated in said pick-up means.

25. An image pick-up device comprising:
(A) image pick-up means including an array of a plurality of pick-up elements arranged in columns and rows, each of said elements generating an image element signal corresponding to a received portion of an image, and each element having a storage capacity for storing the generated image element signal, wherein the storage capacity of each of the elements included in a selected row is larger than that of each of the elements included in other rows; and
(B) storage means for storing the electrical signals transferred from said image pick-up means.

26. The device according to claim 25, wherein said selected row in said pick-up element array is located at a position near said storage means.

27. The device according to claim 26, wherein said selected row is located at the position substantially neighboring with the storage means.

28. The device according to claim 27, wherein said storage means includes an array of a plurality of storage elements arranged in columns and rows, each of said storage elements having a storage capacity for storing an electrical signal, and the storage capacity of each of the storage elements being nearly equal to that of each of the pick-up elements included in said selected row in said pick-up element array.

29. The device according to claim 28, wherein the storage capacity of each of the pick-up elements included in said selected row is nearly equal to twice the storage capacity of each of the pick-up elements included in said other rows.

30. The device according to claim 29, wherein the number of rows of said storage element array is nearly equal to one half the number of rows of said pick-up element array.

31. The system according to claim 28, wherein the number of rows of said storage element array is fewer than the number of rows of said pick-up element array in said image pick-up means.

32. The device according to claim 28, further comprising:
read-out means for reading out the signals stored in said storage means, said read-out means including an array of a plurality of read-out elements arranged in a row, each of said read-out elements having a storage capacity for storing an electrical signal, and the storage capacity of each of said read-out elements being nearly equal to that of each of said storage elements in said storage means.

33. The device according to claim 32, further comprising:
transfer and read-out means disposed between said pick-up means and said storage means for transferring the signals from the pick-up means to the storage means and for reading out the signals from the pick-up means, said transfer and read-out means including an array of a plurality of transfer and read-out elements arranged in a row, each of said transfer and read-out elements having a storage capacity for storing an electrical signal, and the storage capacity of each of said transfer and read-out elements being nearly equal to that of each of said pick-up elements included in said selected row in said pick-up element array.

34. The device according to claim 27, wherein said storage means includes an array of a plurality of storage elements arranged in columns and rows, each of said storage elements having a storage capacity for storing an electrical signal, and the storage capacity of each of the storage elements being larger than that of each of the pick-up elements included in said other rows in said pick-up element array.

35. The device according to claim 34, wherein the number of rows of said storage element array is fewer than the number of rows of said pick-up element array in said image pick-up means.

36. The device according to claim 34, further comprising:
read-out means for reading out the signals stored in said storage means, said read-out means including an array of a plurality of read-out elements arranged in a row, each of said read-out elements having a storage capacity for storing an electrical signal, and the storage capacity of each of said read-out elements being larger than that of each of said pick-up elements included in said other rows in said pick-up element array.

37. The device according to claim 36, further comprising:
transfer and read-out means disposed between said pick-up means and said storage means for transferring the signals from the pick-up means to the storage means and for reading out the signals from the pick-up means, said transfer and read-out means including an array of a plurality of transfer and read-out elements arranged in a row, each of said transfer and read-out elements having a storage capacity for storing an electrical signal, and the storage capacity of each of said transfer and read-out elements being larger than that of each of said pick-up elements included in said other rows in said pick-up element array.

38. A system for generating an electrical indication indicative of an image scansion, comprising in combination:
(A) image sensing means including a plurality of one-dimensional image sensing arrays arranged in parallel with each other, each of said sensing arrays being for generating an electrical indication indicative of a line scansion of a portion of an image, a selected portion of said sensing means being light shielded;
(B) blooming prevention means for said sensing means to prevent the electrical indications from blooming in said sensing means;
(C) read-out means for reading out the electrical indications from said sensing means; and
(D) control means for controlling said sensing means and said read-out means, said control means causing said sensing means to successively form, at said selected light shielded portion of said sensing arrays, composite electrical indications each being composed of a selected plural number of said line scansion indications and causing said read-out means to successively read-out said composite electrical indications formed by said sensing means.

39. An image pick-up device comprising:
(A) image pick-up means including an array of a plurality of pick-up elements, each of said elements generating an image element signal corresponding to a received portion of an image, and each element having a storage capacity for storing the generated image element signal, wherein each of said element included in a selected portion of said pick-up means is light shielded and has a storage capacity larger than that of each of said elements included in another portion;
(B) blooming prevention means for said pick-up means to prevent overflow signals from blooming in said pick-up means; and
(C) read-out means for reading out the signal from said pick-up means.

* * * * *

UNITED STATES PATENT AND TRADEMARK OFFICE
CERTIFICATE OF CORRECTION

PATENT NO. : 4,551,758

DATED : November 5, 1985

INVENTOR(S) : MAKOTO MASUNAGA, ET AL.

It is certified that error appears in the above-identified patent and that said Letters Patent is hereby corrected as shown below:

Col. 2, lines 6 and 7, change "pho-/tocell" to --pho-/tocells--.

Col. 2, line 42, change "each of photocells" to --each of the photocells--.

Col. 2, line 44, change "each of photocells" to --each of the photocells--.

Col. 3, line 5, change "cell" to --cells--.

Col. 3, line 6, change "photocell" to --photocells--.

Col. 3, line 49, change "invention, shown" to --invention shown--.

Col. 5, line 2, change "cnarge" to --charge--.

Col. 5, line 62, change "columb-like" to --comb-like--.

Col. 7, lines 10 and 11, change "regions I" and I"" to --regions I" and II"--.

Col. 8, line 57, change "corresponds" to --which corresponds--.

Col. 8, line 44, change "is" to --are--.

Col. 8, line 57, change "corresponds" to --, corresponding--.

Col. 8, line 61, change "this" to --these--.

Col. 9, line 6, change "has" to --have--.

Col. 9, line 9, change "is" to --are--.

Col. 9, line 34, change "charge" to --charges--.

Col. 9, line 35,      "       "       "       "

Col. 9, line 39,      "       "       "       "

Col. 9, line 30,      "       "       "       "

UNITED STATES PATENT AND TRADEMARK OFFICE
CERTIFICATE OF CORRECTION

PATENT NO. : 4,551,758

DATED : November 5, 1985

INVENTOR(S) : MAKOTO MASUNAGA, ET AL.

It is certified that error appears in the above-identified patent and that said Letters Patent is hereby corrected as shown below:

Col. 9, line 44, change "charge" to --charges--.
Col. 9, line 46,    "      "       "      "
Col. 9, line 67,    "      "       "      "
Col. 10, line 15, change "the" to --to--.
Col. 10, line 21, change "This" to --These--.
Col. 10, line 25, change "charge" to --charges--.
Col. 10, line 27,    "      "       "      "
Col. 10, line 51, delete "signals".
Col. 11, line 4, change "performed in" to --performed, in--.
Col. 11, line 12, change "charge" to --charges--.
Col. 11, line 16,    "      "       "      "
Col. 11, line 19,    "      "       "      "
Col. 11, line 23,    "      "       "      "
Col. 11, line 27,    "      "       "      "
Col. 12, line 55, change "changes" to --charges--.
Col. 13, line 31, change "$\phi_{S'}$," to --$\phi_{S'}$--.
Col. 13, line 33, change "$\phi_{S'}$," to --$\phi_{S'}$--.
Col. 13, line 49, change "most" to --must--.
Col. 13, line 66, change "$\phi_S$," to --$\phi_{S'}$--.
Col. 14, line 1, change "has" to --have--.
Col. 14, line 3, change "14.318118-MHz" to --14.31818MHz--.

UNITED STATES PATENT AND TRADEMARK OFFICE
CERTIFICATE OF CORRECTION

PATENT NO. : 4,551,758              Page 3 of 3

DATED : November 5, 1985

INVENTOR(S) : MAKOTO MASUNAGA, ET AL.

It is certified that error appears in the above-identified patent and that said Letters Patent is hereby corrected as shown below:

Col. 14, line 66, change "$\phi_S$," to --$\phi_{S'}$--.

Col. 15, line 1,   "    "    "    "

Col. 15, line 25,   "    "    "    "

Col. 15, line 32, change "14.318181MHz" to --14.31818MHz--.

Col. 15, line 40, change "$\phi_S$," to --$\phi_{S'}$--.

Col. 17, line 20, change "synchronims" to --synchronism--.

Col. 17, line 56, change "horiozntal" to --horizontal--.

Col. 19, line 25, change "tarnsferred" to --transferred--.

Col. 20, line 5, change "image-pick up" to --image pick-up--.

Col. 23, line 1, change "rearly" to --nearly--.

Signed and Sealed this

Fourth Day of November, 1986

[SEAL]

*Attest:*

DONALD J. QUIGG

*Attesting Officer*      *Commissioner of Patents and Trademarks*